(12) United States Patent
Seo et al.

(10) Patent No.: US 8,976,916 B2
(45) Date of Patent: *Mar. 10, 2015

(54) APPARATUS AND METHOD FOR RECEIVING DUAL BAND RF SIGNALS SIMULTANEOUSLY

(71) Applicant: Electronics and Telecommunications Research Institute, Daejeon (KR)

(72) Inventors: Seok Seo, Daejeon (KR); Hyung-Jung Kim, Daejeon (KR); Jin Up Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/145,110

(22) Filed: Dec. 31, 2013

(65) Prior Publication Data
US 2014/0119485 A1 May 1, 2014

Related U.S. Application Data

(63) Continuation-in-part of application No. 13/242,820, filed on Sep. 23, 2011, now Pat. No. 8,630,381.

(30) Foreign Application Priority Data

Sep. 24, 2010 (KR) .................. 10-2010-0092913
Mar. 11, 2011 (KR) .................. 10-2011-0022055

(51) Int. Cl.
*H04B 1/10* (2006.01)
*H04L 25/08* (2006.01)
(Continued)

(52) U.S. Cl.
CPC ............ *H04L 25/08* (2013.01); *H04L 27/2659* (2013.01); *H04B 1/0007* (2013.01); *H04B 1/005* (2013.01); *H04B 1/0053* (2013.01)
USPC ........................................ 375/350

(58) Field of Classification Search
CPC ..................... H04L 25/08; H04L 27/2659
USPC ............................................... 375/350
See application file for complete search history.

(56) References Cited

U.S. PATENT DOCUMENTS 7,680,227 B2   3/2010   Kavadias et al.
7,924,944 B2   4/2011   Vassiliou et al.
(Continued)

FOREIGN PATENT DOCUMENTS

KR   10-0735326   6/2007

OTHER PUBLICATIONS

Jae-Hyung Kim et al., "Bandpass Sampling Digital Frontend Architecture for Multi-band Access Cognitive Radio", Proceedings of the IEEE Global Telecommunications Conference, 2009, pp. 1-6.
(Continued)

*Primary Examiner* — Juan A Torres
(74) *Attorney, Agent, or Firm* — Staas & Halsey LLP

(57) ABSTRACT

Disclosed is a dual band receiver which includes an analog-to-digital converter configured to convert a dual band analog RF signal into a dual baseband digital signal; and a first signal extractor configured to generate a first path signal and a second path signal from the dual baseband signal and to extract a first baseband signal using a relative sample delay difference between the first and second path signals, wherein the dual baseband signal includes the first baseband signal and a second baseband signal, the first path signal is a signal obtained by sample delay of the dual baseband signal and then down sampling of a resultant signal, and the second path signal is a signal obtained by down sampling of the dual baseband signal without sample delay.

19 Claims, 16 Drawing Sheets

(51) Int. Cl.
*H04L 27/26* (2006.01)
*H04B 1/00* (2006.01)

(56) References Cited

U.S. PATENT DOCUMENTS

| | | |
|---|---|---|
| 8,086,197 B2 | 12/2011 | Doris et al. |
| 2002/0110189 A1 | 8/2002 | Souissi et al. |
| 2007/0140382 A1 | 6/2007 | Qian |

OTHER PUBLICATIONS

Yi-Ran Sun et al., "Generalized Quadrature Sampling with FIR Filtering", IEEE International Symposium on Circuits and Systems, 2005, pp. 4429-4432.

U.S. Patent Notice of Allowance mailed Sep. 11, 2013 in parent U.S. Appl. No. 13/242,820.

U.S. Appl. No. 13/242,820, filed Sep. 23, 2011, Seok Seo et al., Electronics and Telecommunications Research Institute.

ately, a receiver may become complicated and expensive. As a result, there is required a receiver which supports a dual band and a dual mode using a single receiver circuit.

APPARATUS AND METHOD FOR RECEIVING DUAL BAND RF SIGNALS SIMULTANEOUSLY

CROSS-REFERENCE TO RELATED APPLICATIONS

This application is a U.S. continuation application filed under 37 USC 1.53(b) claiming priority benefit of U.S. Ser. No. 13/242,820 filed in the United States on Sep. 23, 2011, which claims earlier priority benefit, under 35 U.S.C §119, of Korean Patent Application Nos. 10-2010-0092913 filed Sep. 24, 2010, and 10-2011-0022055 filed Mar. 11, 2011, the entirety of which is incorporated by reference herein.

BACKGROUND

Exemplary embodiments relate to a radio-frequency (RF) signal receiver used for a wireless communication, and more particularly, relate to a dual band receiver capable of making direct frequency down-conversion and receiving simultaneously two signals transmitted via different frequency bands.

In addition to a small-sized RF communication system, a need for a next-generation RF communication receiver with the flexibility, adaptability, and cognitivity is being increased. Such a need may be satisfied by placing an Analog-to-Digital Converter (ADC) to be closer to an antenna and making frequency conversion and demodulation using a Digital Signal Processor (DSP). A next-generation RF communication receiver satisfying such a condition may be a band pass sampling receiver. The band pass sampling receiver may provide excellent functionality in relation to reconfiguration and multi-band/multi-mode receiving.

A typical band pass sampling receiver may receive an analog RF signal via an antenna and the received signal is bandpass-filtered through an analog bandpass filter. The bandpass-filtered analog signal may be amplified via a Low Noise Amplifier (LNA) and converted into a digital baseband signal via an Analog-Digital Converter ADC. Since the bandpass sampling receiver does not require an analog device such as a mixer and a local oscillator, it may provide a flexible, low cost, and small wireless communication receiver. However, the typical band pass sampling receiver may receive a single RF signal. Further, the typical bandpass sampling receiver may down-convert a received analog RF signal into a baseband signal of a digital format only when a carrier frequency is integer times of a sample rate in receiving a single RF signal.

To simultaneously receive two signals at any frequency band using a general band pass sampling receiver, a sampling rate must be determined such that interference between two signals is not generated at a baseband after digital conversion. However, it is very difficult to determine a sampling rate such that interference between two signals is not generated. Further, a solution of the sampling rate making interference between two signals not generated can't be often obtained. Accordingly, there is limited to simultaneously receive two RF signals at any frequency band using the general band pass sampling receiver.

There may increase a need for a dual band (or, multi-band) receiver which receives simultaneously at least two or more different frequency band signals or at least two or more different communications standards signals, via a single receiver. Further, a communication technique such as a cognitive radio communications system may require a function of receiving any frequency band signal and at the same time, scanning whether a signal exists at another frequency band. However, a general dual band receiver may have a receiver circuit or chip every mode, frequency band, or channel. Accordingly, a receiver may become complicated and expensive. As a result, there is required a receiver which supports a dual band and a dual mode using a single receiver circuit.

SUMMARY

One aspect of embodiments of the inventive concept is directed to provide a dual band receiver which comprises an analog-to-digital converter configured to convert a dual band analog RF signal into a dual baseband digital signal; and a first signal extractor configured to generate a first path signal and a second path signal from the dual baseband signal and to extract a first baseband signal using a relative sample delay difference between the first and second path signals, wherein the dual baseband signal includes the first baseband signal and a second baseband signal, the first path signal is a signal obtained by sample delay of the dual baseband signal and then down sampling of a resultant signal, and the second path signal is a signal obtained by down sampling of the dual baseband signal without sample delay.

In this embodiment, the dual band receiver further comprises a second signal extractor configured to extract the second baseband signal by subtracting the first baseband signal extracted by the first signal extractor from a sample delay result of the second path signal.

In this embodiment, the second signal extractor comprises a second delay configured to delay the second path signal generated from the first signal extractor; and a subtractor configured to extract the second baseband signal by subtracting the first baseband signal extracted by the first baseband extractor from a sample delay result from the second delay.

In this embodiment, the first signal extractor comprises a first delay configured to delay the dual baseband digital signal converted by the analog-to-digital converter; a first down sampler configured to generate the first path signal by down-sampling a delay result of the first delay; a second down sampler configured to generate the second path signal by down-sampling the dual baseband digital signal converted by the analog-to-digital converter; a first digital filter configured to filter the first path signal; a second digital filter configured to filter the second path signal; and an adder configured to output the first baseband signal by adding a filtering result of the first digital filter and a filtering result of the second digital filter.

In this embodiment, the adder is replaced with a subtractor, which outputs the first baseband signal by subtracting a filtering result of the second digital filter from a filtering result of the first digital filter.

In this embodiment, a relative time delay difference due to the relative sample delay difference between the first and second path signals is determined according to a sample rate of the analog-to-digital converter, a delay value of the first delay, and down sampling rates of the first and second down samplers.

In this embodiment, each of digital filter coefficients of the first and second digital filters is determined by at least one of a carrier frequency of each of first and second analog RF signals, a frequency band location index of each of the first and second analog RF signals, a sampling rate of the analog-to-digital converter, a sample delay value of the first delay, a down sampling rate of each of the first and second down samplers, and a sign determined according to inversion of a spectrum of each of the first and second baseband signals.

In this embodiment, each of digital filter coefficients of the first and second digital filters is re-calculated when at least one of a carrier frequency of each of first and second analog RF signals, a frequency band location index of each of the first and second analog RF signals, a sampling rate of the analog-to-digital converter, a sample delay value of the first delay, a down sampling rate of each of the first and second down samplers, and a sign determined according to inversion of a spectrum of each of the first and second baseband signals is changed, and the first and second digital filters are reconfigured based upon the re-calculated digital filter coefficient.

In this embodiment, each of the first and second digital filters is determined to satisfy one of equations: $S(f)=S_A^\delta(f)+S_B^\delta(f)=R_{1-}(f)+R_{1+}(f)$, $S(f)=S_A^\delta(f)+S_B^\delta(f)=R_{2-}(f)+R_{2+}(f)$, $S(f)=S_A^\delta(f)-S_B^\delta(f)=R_{1-}(f)+R_{1+}(f)$, and $S(f)=S_A^\delta(f)-S_B^\delta(f)=R_{2-}(f)+R_{2+}(f)$, and $S(f)$, $S_A^\delta(f)$, $S_B^\delta(f)$, $R_{1-}(f)$, $R_{1+}(f)$, $R_{2-}(f)$, and $R_{2+}(f)$ correspond to a spectrum of the output signal of the adder, a spectrum of the output signal of the first digital filter, a spectrum of the output signal of the second digital filter, a negative frequency spectrum of the first baseband signal, a positive frequency spectrum of the first baseband signal, a negative frequency spectrum of the second baseband signal, and a positive frequency spectrum of the second baseband signal, respectively.

In this embodiment, an operating speed of each of the first and second digital filters is determined by a sampling rate of the analog-to-digital converter and a down sampling rate of each of the first and second down samplers.

In this embodiment, the first and second down samplers are replaced with first and second decimators which configured to down convert a sampling rate by decimating the first and second path signals, each of the first and second decimators including a pre-filter and a down sampler.

In this embodiment, the second digital filter is replaced with a sample delay and a gain adjustment logic.

Another aspect of embodiments of the inventive concept is directed to provide a dual band signal receiving method of a dual band receiver which comprises converting a dual band analog RF signal into a dual baseband digital signal using a single analog-to-digital converter; generating a first path signal and a second path signal from the dual baseband signal; and extracting a first baseband signal using a relative sample delay difference between the first and second path signals, wherein the dual baseband signal includes the first baseband signal and a second baseband signal, the first path signal is a signal obtained by sample-delaying the dual baseband signal and then down sampling a resultant signal, and the second path signal is a signal obtained by down-sampling the dual baseband signal without sample delay.

In this embodiment, the dual band signal receiving method further comprises sample-delaying the second path signal while the first baseband signal is extracted; and extracting the second baseband signal by subtracting the first baseband signal from a sample delay result of the second path signal.

In this embodiment, extracting a first baseband signal comprises sample-delaying the dual baseband digital signal converted by the analog-to-digital converter; generating the first path signal by down-sampling the sample delay result; generating the second path signal by down-sampling the dual baseband digital signal converted by the analog-to-digital converter; filtering the first path signal using a first digital filter; filtering the second path signal using a second digital filter; and extracting the first baseband signal by adding a filtering result of the first digital filter and a filtering result of the second digital filter In this embodiment, each of digital filter coefficients of the first and second digital filters is determined by at least one of a carrier frequency of each of first and second analog RF signals, a frequency band location index of each of the first and second analog RF signals, a sampling rate of the analog-to-digital converter, a sample delay value of the first delay, a down sampling rate for generating the first and second path signals, and a sign determined according to inversion of a spectrum of each of the first and second baseband signals.

In this embodiment, each of digital filter coefficients of the first and second digital filters is re-calculated when at least one of a carrier frequency of each of first and second analog RF signals, a frequency band location index of each of the first and second analog RF signals, a sampling rate of the analog-to-digital converter, a sample delay value of the first delay, a down sampling rate for generating the first and second path signals, and a sign determined according to inversion of a spectrum of each of the first and second baseband signals is changed, and the first and second digital filters are reconfigured based upon the re-calculated digital filter coefficient.

In this embodiment, each of the first and second digital filters is determined to satisfy one of equations: $S(f)=S_A^\delta(f)+S_B^\delta(f)=R_{1-}(f)+R_{1+}(f)$, $S(f)=S_A^\delta(f)+S_B^\delta(f)=R_{2-}(f)+R_{2+}(f)$, $S(f)=S_A^\delta(f)-S_B^\delta(f)=R_{1-}(f)+R_{1+}(f)$, and $S(f)=S_A^\delta(f)-S_B^\delta(f)=R_{2-}(f)+R_{2+}(f)$, and $S(f)$, $S_A^\delta(f)$, $S_B^\delta(f)$, $R_{1-}(f)$, $R_{1+}(f)$, $R_{2-}(f)$, and $R_{2+}(f)$ correspond to a spectrum of the output signal of the adder, a spectrum of the output signal of the first digital filter, a spectrum of the output signal of the second digital filter, a negative frequency spectrum of the first baseband signal, a positive frequency spectrum of the first baseband signal, a negative frequency spectrum of the second baseband signal, and a positive frequency spectrum of the second baseband signal, respectively.

In this embodiment, an operating speed of each of the first and second digital filters is determined by a sampling rate of the analog-to-digital converter and the down sampling rate.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
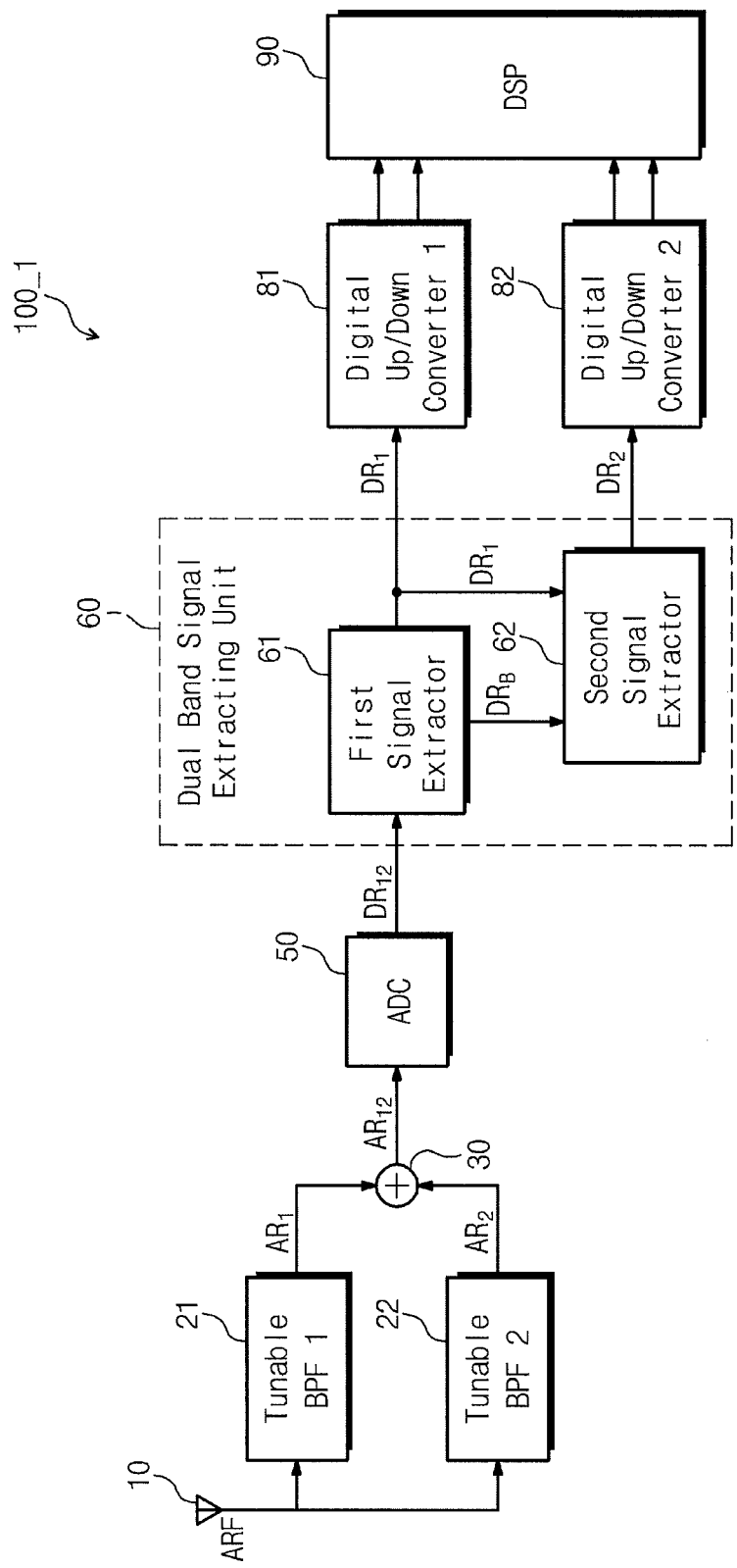
FIG. 1 is a diagram illustrating a dual band receiver according to an exemplary embodiment of the inventive concept.

The inventive concept is described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a diagram illustrating a dual band receiver according to an exemplary embodiment of the inventive concept. A dual band receiver may be formed of a band pass sampling receiver.

Referring to FIG. 1, a dual band receiver 100_1 may include an antenna 10, first and second band pass filters 21 and 22, an adder 30, an Analog-Digital Converter (ADC) 50, a dual band signal extracting unit 60, first and second digital up/down converters 81 and 82, and a Digital Signal Processor (DSP) 90.

The antenna 10 may receive an analog RF signal which is transmitted in wireless. The input analog RF signal to the antenna 10 may include at least two or more frequency bands signals. The first and second band pass filters 21 and 22 may be formed of a wideband band pass filter which filters a wideband signal. The first band pass filter 21 may be designed such that a pass band is limited to a first bandwidth B1. The first band pass filter 21 may generate a first analog RF signal $AR_1$ having the first bandwidth B1 and a first carrier frequency fc1. The second band pass filter 22 may be designed such that a pass band is limited to a second bandwidth B2. The second band pass filter 22 may generate a second analog RF signal $AR_2$ having the second bandwidth B2 and a second carrier frequency $f_{c2}$. In an embodiment, pass bands and pass bandwidths B1 and B2 of the first and second band pass filters 21 and 22 may have a fixed value or may be adjusted to another value. To this end, the first and second band pass filters 21 and 22 may be formed of a tunable band pass filter.

The adder 30 may add a filtering result of the first band pass filter 21 and a filtering result of the second band pass filter 22 to generate a dual band analog RF signal AR12.

Figure 2:
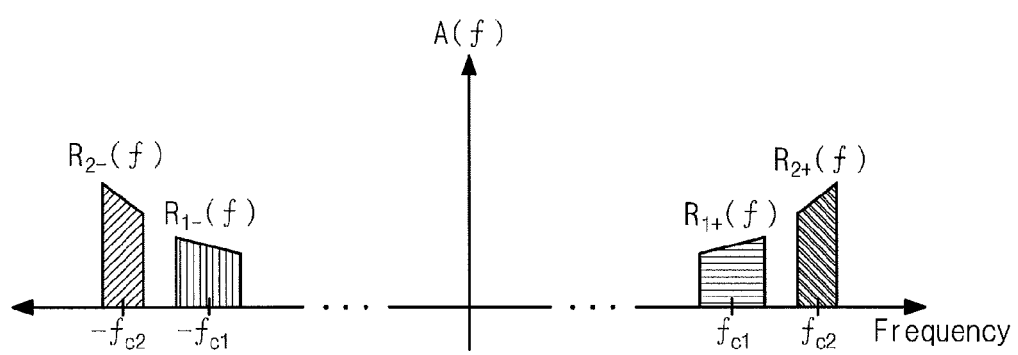
FIG. 2 is a diagram illustrating analog spectrums of two signals at any frequency band.

FIG. 2 is a diagram illustrating analog spectrums of two signals at any frequency band.

Referring to FIG. 2, it is assumed that a first analog RF signal $AR_1$ has a first carrier frequency $f_{c1}$ and a first signal bandwidth B1. Further, it is assumed that a second analog RF signal $AR_2$ has a second carrier frequency $f_{c2}$ and a second signal bandwidth B2. In FIG. 2, $R_{AR1+}(f)$ may indicate a positive frequency spectrum of the first analog RF signal $AR_1$, and $R_{AR1-}(f)$ may indicate a negative frequency spectrum of the first analog RF signal $AR_1$. $R_{AR2+}(f)$ may indicate a positive frequency spectrum of the second analog RF signal $AR_2$, and $R_{AR2\_}(f)$ may indicate a negative frequency spectrum of the second analog RF signal $AR_2$.

Returning to FIG. 1, the ADC 50 may convert the dual band analog RF signal $AR_{12}$ provided from the adder 30 into a dual baseband digital signal $DR_{12}$. For example, the dual band analog RF signal $AR_{12}$ provided via the adder 30 may be converted to the dual baseband digital signal $DR_{12}$ having a sampling rate of $f_S$ via the ADC 50. The dual baseband digital signal $DR_{12}$ converted via the ADC 50 may correspond to a sum of a first baseband signal $DR_1$ having a first bandwidth B1 and a second baseband signal $DR_2$ having a second bandwidth B2.

The dual band signal extracting unit 60 may extract the first baseband signal $DR_1$ and the second baseband signal $DR_2$ from the dual baseband digital signal $DR_{12}$ output from the ADC 50. To this end, the dual band signal extracting unit 60 may include a first signal extractor 61 and a second signal extractor 62. The first signal extractor 61 may generate a first path signal $DR_A$ and a second path signal $DR_B$ from the dual baseband digital signal $DR_{12}$. The first path signal $DR_A$ may be a signal obtained by down-sampling the sample-delayed signal $DR_{12\_}D$ of the dual baseband digital signal $DR_{12}$, and the second path signal $DR_B$ may be a signal obtained by down sampling the dual baseband digital signal $DR_{12}$ without sampling delay.

The first signal extractor 61 may be configured to exactly extract a wanted baseband signal (e.g., the first baseband signal $DR_1$) by removing aliasing between the first and second baseband signals $DR_1$ and $DR_2$ using a relative phase difference due to a relative sampling delay difference between the first and second path signals $DR_A$ and $DR_B$.

The second signal extractor 62 may be configured to extract a second baseband signal $DR_2$ using the first baseband signal $DR_1$ extracted by the first signal extractor 61 and the second path signal $DR_B$.

With the dual band signal extracting unit 60 of the inventive concept, although interference between the first and second baseband signals $DR_1$ and $DR_2$ is generated at a baseband due to the aliasing, it is possible to extract the first and second baseband signals $DR_1$ and $DR_2$ perfectly and simultaneously. Thus, a dual band and a dual-mode signal receiving may be supported using a single receiver circuit. In particular, since a receiver circuit of the inventive concept uses a single ADC, it is possible to implement a simple and high-integrity receiver. Accordingly, a cost may be lowered, and power consumption may be reduced.

With the above-described configuration, the dual band receiver of the inventive concept may receive at least two or more signals having any frequency band and signal bandwidth using a single receiver circuit. Further, in a communication system such as a cognitive radio communication system, it is possible to provide a function of receiving any frequency band signal and at the same time, scanning whether a signal exists at another frequency band.

The dual band signal extracting unit 60 may be configured to selectively extract either one of the first and second baseband signals $DR_1$ and $DR_2$ from the dual baseband signal $DR_{12}$ output from the ADC 50. In this case, an actual signal extracting operation may be performed only by the first signal extractor 61.

The first and second baseband signals $DR_1$ and $DR_2$ extracted from the dual band signal extracting unit 60 may be provided to the first and second digital up/down converters 81 and 82 such that digital frequency up/down conversion is made. A conversion result of the first and second baseband signals $DR_1$ and $DR_2$ may be provided to the DSP 90 such that baseband signal processing (e.g., demodulation) is made.

Figure 3:
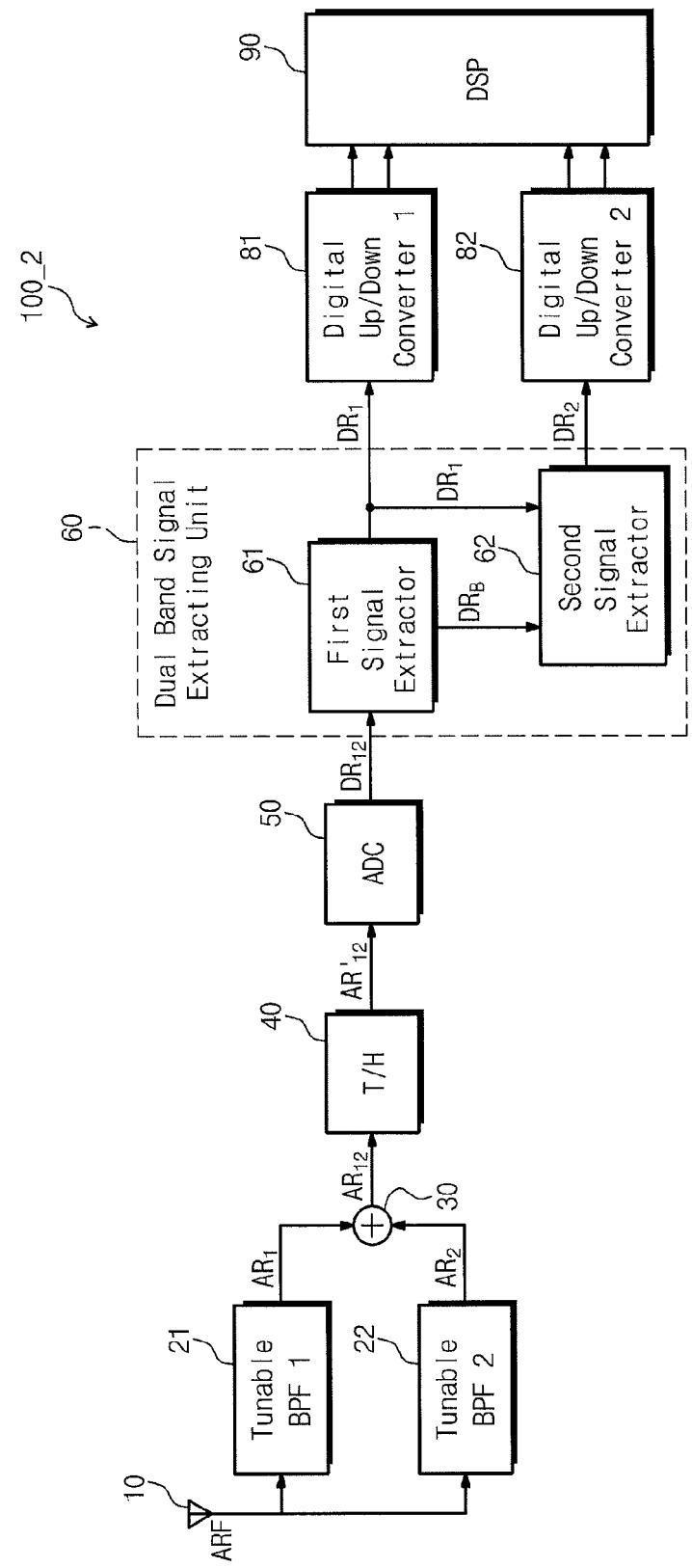
FIG. 3 is a diagram illustrating a dual band receiver according to another exemplary embodiment of the inventive concept.

FIG. 3 is a diagram illustrating a dual band receiver according to another exemplary embodiment of the inventive concept.

Referring to FIG. 3, a dual band receiver 100_2 may further include a track and holder 40 in addition to components of a dual band receiver 100_1 illustrated in FIG. 1. The remaining components of the dual band receiver 100_2 other than the track and holder 40 may be substantially identical to those in FIG. 1, and description thereof is thus omitted.

The track and holder 40 called a sample-and-holder may function as an input-sampling circuit. Although not illustrated in FIG. 3, the track and holder 40 may be formed of an analog switch and a sampling switch. If the sampling switch is closed, the track and holder 40 may operate at a track mode for tracking an input signal. If the sampling switch is open, the track and holder 40 may operate at a hold mode, in which the track and holder 40 keeps a last instantaneous value of the input using the sampling capacitor. With operations of the track and hold modes executed by the track and holder 40, an analog-digital conversion bandwidth to be processed by an ADC 50 may be increased.

With the dual band receivers 100_1 and 100_2 described in relation to FIGS. 1 and 3, the dual band receivers 100_1 and 100_2 may make direct down conversion of a dual band analog RF signal, located at any band, into a baseband using a single ADC 50. Although interference due to aliasing is generated at a baseband, it is possible to remove the aliasing via a dual band signal extracting unit 60. Accordingly, at least two or more analog RF signals at any frequency band can be received at the same time. This may mean that at least two or more frequency band signals are received using a single receiver circuit or chip including the single ADC 50 without independently implementing a receiver circuit or chip every frequency band or channel. As a result, since a dual band and a dual mode are supported using a single receiver circuit, it is possible to simplifying a receiver circuit and to lower a fabrication cost thereof.

The dual band signal extracting unit 60 illustrated in FIGS. 1 and 3 is not limited to this disclosure. For example, the dual band signal extracting unit 60 can be modified or changed variously, which will be more fully described with reference to embodiments to be described later. Further, a first signal extractor can be modified or changed variously.

Figure 4:
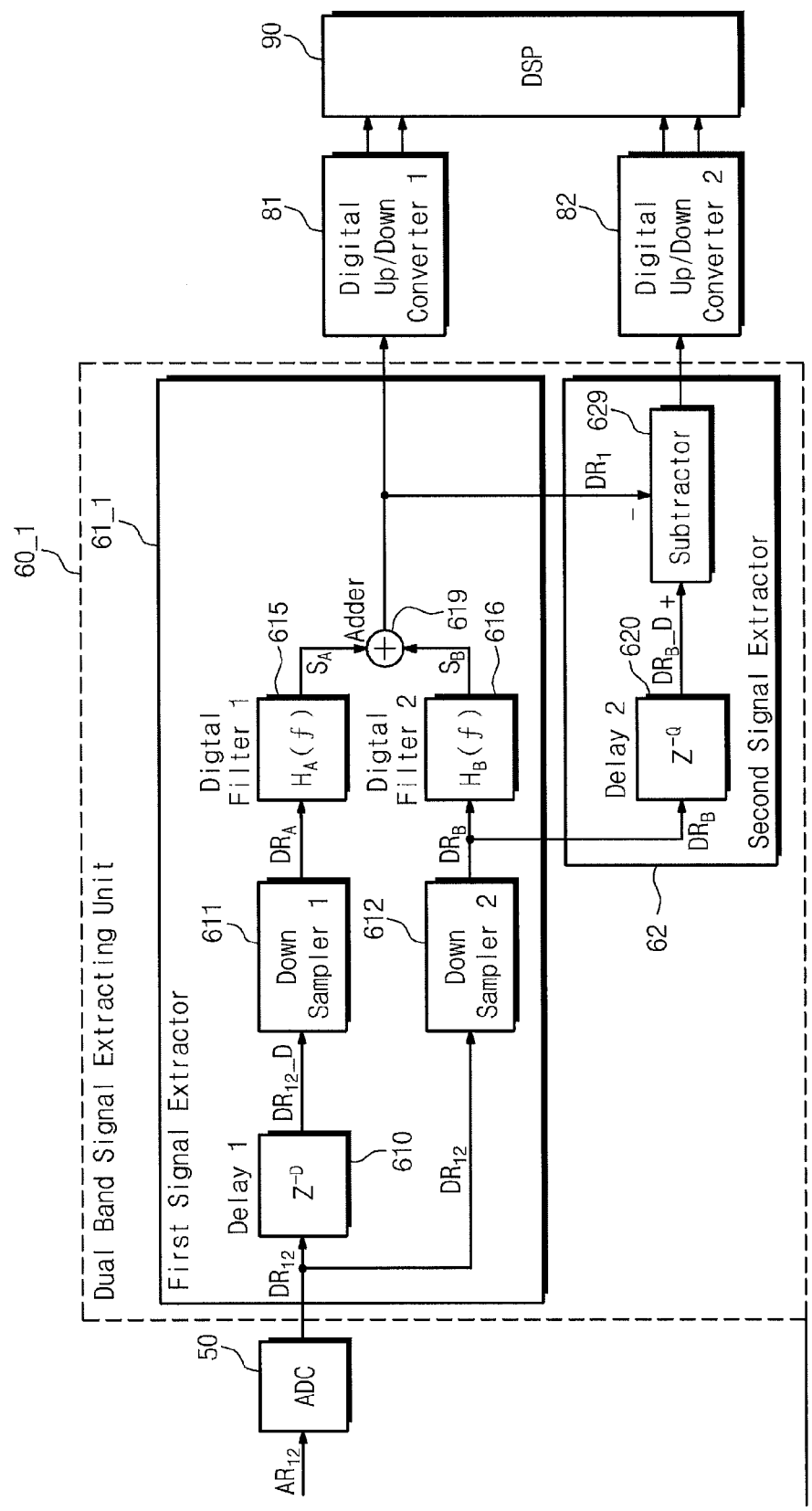
FIG. 4 is a diagram illustrating a dual band signal extracting unit according to an exemplary embodiment of the inventive concept.

FIG. 4 is a diagram illustrating a dual band signal extracting unit according to an exemplary embodiment of the inventive concept.

Referring to FIG. 4, a dual band signal extracting unit 60_1 may include a first signal extractor 61_1 and a second signal extractor 62.

The first signal extractor 61_1 may generate a first path signal $DR_A$ through sample delay and down sampling and a second path signal $DR_B$ through only down sampling without sample delay, using a dual baseband digital signal $DR_{12}$ output from an ADC 50. Herein, the first path signal $DR_A$ may be a signal obtained by forcing sample delay and down sampling to the dual baseband digital signal $DR_{12}$. The second path signal $DR_B$ may be a signal obtained by forcing down sampling to the dual baseband digital signal $DR_{12}$.

The first signal extractor 61_1 may extract a first baseband signal DR1 via first and second digital filters 615 and 616 and an adder 619. The first and second digital filters 615 and 616 may be designed depending upon a relative phase difference due to a relative sample delay difference between the first and second path signals $DR_A$ and $DR_B$. The second signal extractor 62 may receive the second path signal $DR_B$ from the first signal extractor 61_1, and may extract a second baseband signal $DR_2$ by subtracting the first baseband signal $DR_1$, being an output signal of the first signal extractor 61_1, from a signal obtained by sample-delaying the second path signal $DR_B$ from the first signal extractor 61_1.

The first and second signal extractors 61_1 and 62 will be more fully described below.

The first signal extracting unit 61_1 may include a first delay 610, first and second down samplers 611 and 612, first and second digital filters 615 and 616, and an adder 619.

The first delay 610 may delay by D-sample a dual baseband digital signal $DR_{12}$ output from an ADC 50. Herein, a sample delay value D may have an integer value larger than 0 and smaller than a down sample rate N. A signal delayed via the first delay 610 may be down-sampled such that a sample rate becomes 1/N via the first down sampler 611. The first path signal $DR_A$ being an output signal of the first down sampler 611 may be provided to the first digital filter 615.

The dual baseband digital signal $DR_{12}$ output from the ADC 50 may be provided to the second down sampler 612 without sample delay to generate the second path signal $DR_B$. The dual baseband digital signal $DR_{12}$ output from the ADC 50 may be down-sampled such that a sample rate becomes 1/N via the second down sampler 612. The second path signal $DR_B$ output from the second down sampler 612 may be provided to the second digital filter 616 and the second signal extractor 62. Sample rates $f_S$ of signals output from the first and second down samplers 611 and 612 may be $f_S/N$. With the above-described configuration of the inventive concept, a relative sample delay difference of D/N may exist between the first and second path signals $DR_A$ and $DR_B$ output from the first and second down samplers 611 and 612.

Figure 5:
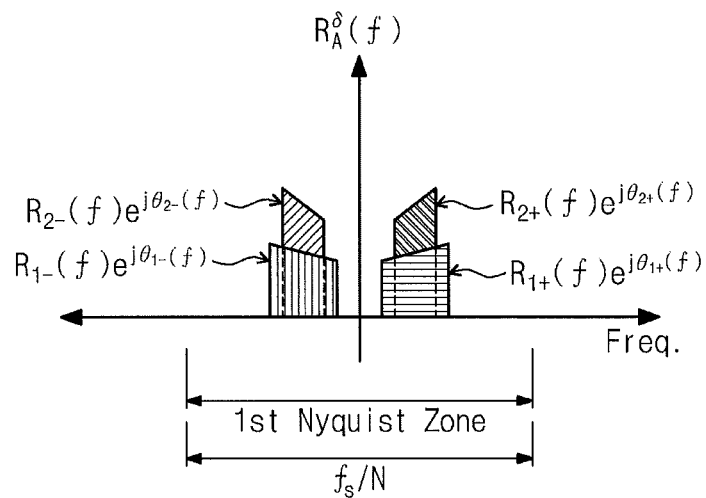
FIG. 5 is a diagram illustrating a spectrum of a first path signal output from a first down sampler illustrated in FIG. 4.
Figure 6:
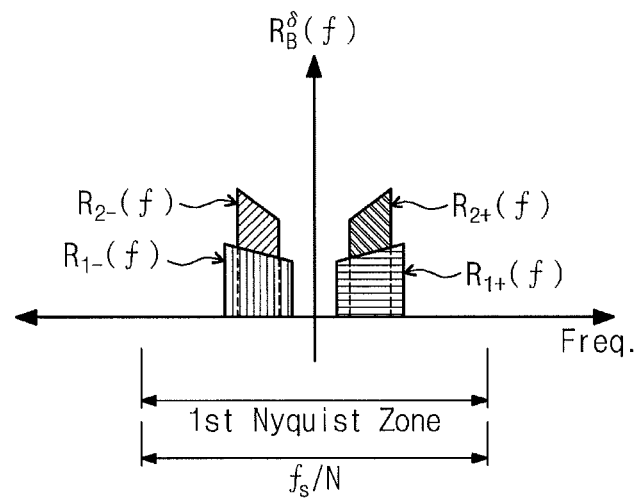
FIG. 6 is a diagram illustrating a spectrum of a second path signal output from a second down sampler illustrated in FIG. 4.
Figure 7:
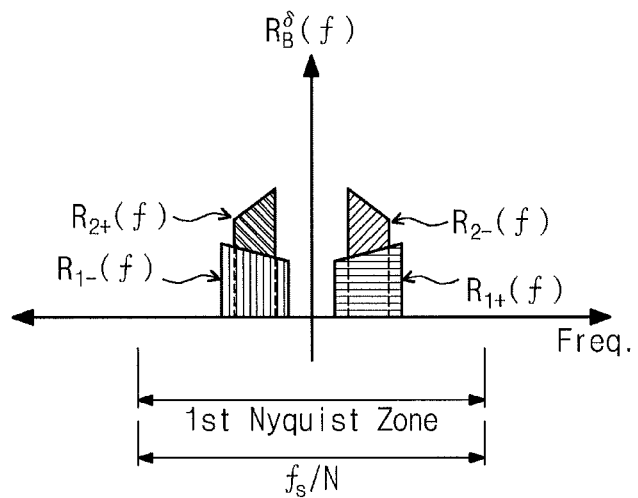
FIGS. 7 to 9 are diagrams illustrating a spectrum of a second path signal output from a second down sampler illustrated in FIG. 4.
Figure 8:
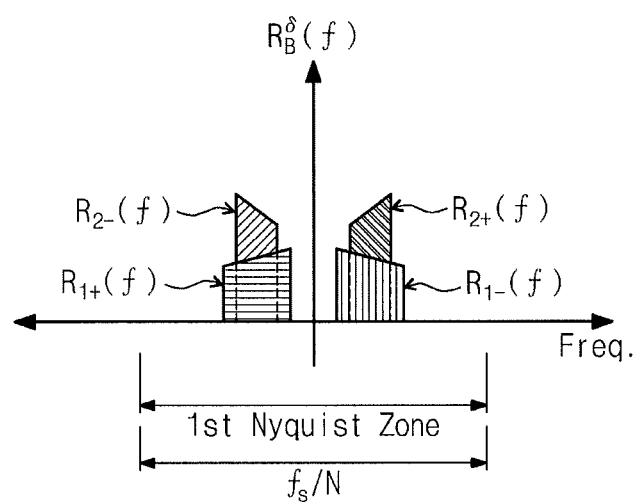
Figure 9:
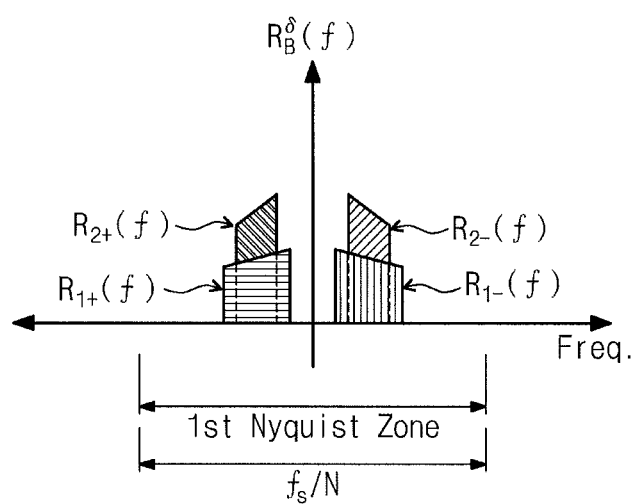

FIG. 5 is a diagram illustrating a spectrum of a first path signal output from a first down sampler illustrated in FIG. 4. FIG. 6 is a diagram illustrating a spectrum of a second path signal output from a second down sampler illustrated in FIG. 4. FIGS. 7 to 9 are diagrams illustrating a spectrum of a first path signal output from a first down sampler illustrated in FIG. 4.

Spectrums illustrated in FIGS. 5 to 9 may correspond to a spectrum within a first Nyquist zone. Referring to FIGS. 5 to 9, it is understood that the aliasing between first and second baseband signals $DR_1$ and $DR_2$, constituting a first path signal $DR_A$, and first and second baseband signals $DR_1$ and is generated at a baseband. That is, the first and second baseband signals $DR_1$ and $DR_2$ may cause mutual interference at a baseband. Nevertheless, a dual band receiver 100_1/100_2 of the inventive concept may remove the aliasing between the first and second baseband signals $DR_1$ and $DR_2$ to exactly extract the first and second baseband signals $DR_1$ and $DR_2$, respectively. There will be described a configuration for extracting the first and second baseband signals $DR_1$ and $DR_2$ when the aliasing is generated between first and second baseband signals $DR_1$ and $DR_2$. Signal characteristics of the first and second path signals $DR_A$ and $DR_B$ of the inventive concept are as follows.

As described above, the first path signal $DR_A$ may be a signal obtained by D-sample delaying an output signal of an ADC 50 and then down sampling it. On the other hand, the second path signal $DR_B$ may be a signal obtained by down sampling an output signal of the ADC 50 without sample delay. As a result, the first path signal $DR_A$ may be a signal obtained by delaying the second path signal $DR_B$ by $D/f_s(=D/Nf_s')$. Thus a spectrum of the first path signal $DR_A$ may be identical to one of the second path signal $DR_B$ except for the effect of a group delay due to a relative time delay difference between the first and the second path signals $DR_A$ and $DR_B$.

The effect of the group delay due to a time delay of the first baseband signal $DR_1$ included in the first path signal $DR_A$ may be expressed by:

$$e^{j\theta_{1-}(f)} = e^{\frac{j2\pi s_1 n_1 D}{N}} e^{-\frac{j2\pi D f}{Nf_s'}}$$

on a spectrum component shifted from a negative frequency band and $$e^{j\theta_{1+}(f)} = e^{-\frac{j2\pi s_1 n_1 D}{N}} e^{-\frac{j2\pi D f}{Nf_s'}}$$

on a spectrum component shifted from a positive frequency band.

The effect of the group delay due to a time delay of the second baseband signal $DR_2$ included in the second path signal $DR_B$ may be expressed by:

$$e^{j\theta_{2-}(f)} = e^{\frac{j2\pi s_2 n_2 D}{N}} e^{-\frac{j2\pi D f}{Nf_s'}}$$

on a spectrum component shifted from a negative frequency band and $$e^{j\theta_{2+}(f)} = e^{-\frac{j2\pi s_2 n_2 D}{N}} e^{-\frac{j2\pi D f}{Nf_s'}}$$

on a spectrum component shifted from a positive frequency band. Herein, $s_1$ and $s_2$ may indicate signs determined according to whether spectrums of the first and second baseband signals $DR_1$ and $DR_2$ are inverted. $s_1$ and $s_2$ may have a sign of −1 when a spectrum is inverted and a sign of +1 when no spectrum is inverted. Accordingly, $(s_1, s_2)$ may be one of four cases, that is, (+1, +1), (+1, −1), (−1, +1), and (−1, −1), which correspond to spectrums illustrated in FIGS. 5, 7, 8, and 9, respectively.

For example, in FIG. 5, there is illustrated the case that spectrums of the first and second baseband signals $DR_1$ and $DR_2$ are not inverted, that is, $(s_1, s_2)$=(+1, +1). In FIG. 7, there is illustrated the case that a spectrum of the first baseband signal DR1 is not inverted and a spectrum of the second baseband signal $DR_2$ is inverted, that is, $(s_1, s_2)$=(+1, −1). In FIG. 8, there is illustrated the case that a spectrum of the first baseband signal DR1 is inverted and a spectrum of the second baseband signal $DR_2$ is not inverted, that is, $(s_1, s_2)$=(−1, +1). In FIG. 9, there is illustrated the case that spectrums of the first and second baseband signals $DR_1$ and $DR_2$ are inverted, that is, $(s_1, s_2)$=(−1, −1).

Herein, spectrum inversion may mean that a spectrum component shifted from a positive frequency is located at a negative frequency at a baseband and a spectrum component shifted from a negative frequency is located at a positive frequency at a baseband. $n_1$ and $n_2$ may be frequency band location indexes of first and second analog RF signals $AR_1$ and $AR_2$, and may have an integer value. The $n_1$ and $n_2$ may be determined as follows by a sampling rate $f_S(=f_S/N)$ at outputs of first and second down samplers 611 and 612 and signal carrier frequencies $f_{c1}$ and $f_{c2}$.

$$n_1 = \text{round}\left[\frac{f_{c1}}{\frac{fs}{N}}\right] \tag{1}$$

$$n_2 = \text{round}\left[\frac{f_{c2}}{\frac{fs}{N}}\right] \tag{2}$$

In equations, round may indicate a round.

The first and second baseband signals $DR_1$ and $DR_2$ may be separated by designing first and second digital filters 615 and 616 using a relationship between the first path signal $DR_A$ and the second path signal $DR_B$ and affection of a relative sample delay between the first and second baseband signals $DR_1$ and $DR_2$ included in the first path signal $DR_A$. In an embodiment, the first and second digital filters 615 and 616 may be formed of a Finite Impulse Response (FIR) filter.

With the inventive concept, the first or second baseband signal $DR_1$ or $DR_2$ may be extracted from an added signal of the first and second baseband signal $DR_1$ and $DR_2$, using the first and second digital filters 615 and 616 and an adder 619. If a dual band receiver of the inventive concept selectively receives one baseband signal (e.g., the first baseband signal $DR_1$), another baseband signal (e.g., the second baseband signal $DR_2$) being not extracted may be removed because it is recognized to be an interference signal.

The first and second digital filters 615 and 616 may be designed according to the following manner.

A frequency response of the first digital filter 615 may be expressed by $H_A(f)$, and a frequency response of the second digital filter 616 may be expressed by $H_B(f)$.

Referring to FIGS. 5 to 9, a spectrum of the first path signal $DR_A$ and a spectrum of the second path signal $DR_B$ within a first Nyquist zone at outputs of the first and second down samplers 611 and 612 may be expressed by the following equations.

$$R_A^\delta = f_{s'}\begin{bmatrix} R_{1-}(f)e^{\frac{j2\pi s_1 n_1 D}{N}}e^{-\frac{j2\pi D_f}{Nf_s'}}+ \\ R_{1+}(f)e^{-\frac{j2\pi s_1 n_1 D}{N}}e^{-\frac{j2\pi D_f}{Nf_s'}}+ \\ R_{2-}(f)e^{\frac{j2\pi s_2 n_2 D}{N}}e^{-\frac{j2\pi D_f}{Nf_s'}}+ \\ R_{2+}(f)e^{-\frac{j2\pi s_2 n_2 D}{N}}e^{-\frac{j2\pi D_f}{Nf_s'}} \end{bmatrix} \tag{3}$$

$$R_N^\delta = f_{s'}\{R_{1-}(f)+R_{1+}(f)+R_{2-}(f)+R_{2-}(f)\} \tag{4}$$

Herein, $R_{1-}(f)$ and $R_{1+}(f)$ may indicate negative and positive frequency components of the first baseband signal $DR_1$ on a first signal path, and $R_{2-}(f)$ and $R_{2+}(f)$ may indicate negative and positive frequency components of the second baseband signal $DR_2$ on the second signal path.

The negative frequency spectrum components of $R_{1-}(f)$ and $R_{2-}(f)$ and the positive frequency spectrum components of $R_{1+}(f)$ and $R_{2+}(f)$ of the first and second baseband signals $DR_1$ and $DR_2$ on the second signal path may be a baseband replica spectrum that a negative frequency and a positive frequency spectrum component of first and second analog RF signals is frequency shifted.

A spectrum of the first path signal $DR_A$ passing through the first digital filter 615 and a spectrum of the second path signal $DR_B$ passing through the second digital filter 616 may be expressed by the following equations respectively.

$$S_A^\delta(f) = f_{s'}{}^\prime H_A(f)\begin{bmatrix} R_{1-}(f)e^{\frac{j2\pi s_1 n_1 D}{N}}e^{-\frac{j2\pi D_f}{Nf_s'}}+ \\ R_{1+}(f)e^{-\frac{j2\pi s_1 n_1 D}{N}}e^{-\frac{j2\pi D_f}{Nf_s'}}+ \\ R_{2-}(f)e^{\frac{j2\pi s_2 n_2 D}{N}}e^{-\frac{j2\pi D_f}{Nf_s'}}+ \\ R_{2+}(f)e^{-\frac{j2\pi s_2 n_2 D}{N}}e^{-\frac{j2\pi D_f}{Nf_s'}} \end{bmatrix} \tag{5}$$

$$S_B^\delta(f) = f_{s'}H_B(f)\{R_{1-}(f)+R_{1+}(f)+R_{2-}(f)+R_{2-}(f)\} \tag{6}$$

A filtering result of the first path signal $DR_A$ passing through the first digital filter 615 and a filtering result of the second path signal $DR_B$ passing through the second digital filter 616 may be added via the adder 619.

A spectrum of an output signal of the adder 619 illustrated in FIG. 4 may be expressed by the following equation.

$$S(f) = S_A^\delta(f) + S_B^\delta(f) \tag{7}$$

In order to obtain the first baseband signal DR1 by removing the second baseband signal DR2 via the first signal extractor 61_1, the first and second digital filters 615 and 616 may be designed to satisfy the following equation.

$$S(f) = S_A^\delta(f) + S_B^\delta(f) = R_{1-}(f) + R_{1+}(f) \tag{8}$$

In relation to the equation 8, $H_A(f)$ corresponding to a frequency response of the first digital filter 615 may be expressed by the following equations 9-1 to 9-3, and $H_B(f)$ corresponding to a frequency response of the second digital filter 616 may be expressed by the following equations 10-1 to 10-3.

$$H_A(f') = \left\{\left(-e^{-\frac{j2\pi s_2 n_2 D}{N}}e^{\frac{j2\pi D_f}{Nf_s'}}\right) \bigg/ f_s'\left(1 - e^{\frac{j2\pi(s_1 n_1 - s_2 n_2)D}{N}}\right)\right\}, \tag{9-1}$$

$$-f_s' < f < 0$$

$$H_A(f') = \left\{\left(-e^{-\frac{j2\pi s_2 n_2 D}{N}}e^{\frac{j2\pi D_f}{Nf_s'}}\right) \bigg/ f_s'\left(1 - e^{\frac{j2\pi(s_1 n_1 - s_2 n_2)D}{N}}\right)\right\}, \tag{9-2}$$

$$0 < f < \frac{f_s'}{2}$$

$$H_A(f') = 0, \text{ otherwise} \tag{9-3}$$

$$H_B(f') = \left\{1 \bigg/ f_s'\left(1 - e^{\frac{j2\pi(s_1 n_1 - s_2 n_2)D}{N}}\right)\right\}, -\frac{f_s'}{2} < f < 0 \tag{10-1}$$

$$H_B(f') = \left\{1 \bigg/ f_s'\left(1 - e^{\frac{j2\pi(s_1 n_1 - s_2 n_2)D}{N}}\right)\right\}, 0 < f < \frac{f_s^1}{2} \tag{10-2}$$

$$H_B(f') = 0, \text{ otherwise} \tag{10-3}$$

An impulse response $h_A(t)$ of the first digital filter 615 expressed by the following equation 11 may be obtained by inverse Fourier transforming the above equation 9-1, 9-2, or 9-3 corresponding to a frequency response of the first digital filter 615, and an impulse response $h_B(t)$ of the second digital filter 616 expressed by the following equation 12 may be obtained by inverse Fourier transforming the above equation 10-1, 10-2, or 10-3 corresponding to a frequency response of the second digital filter 616.

$$h_A(t) = A/B \tag{11}$$

Herein, A may be expressed by $$-\sin\left(2\pi s_1 n_1 \frac{D}{N}\right) + \sin\left(2\pi s_2 n_2 \frac{D}{N}\right) + \sin\left[2\pi s_1 n_1 \frac{D}{N} + \pi\left(\frac{D}{N} + f'_s t\right)\right] - \sin\left[2\pi s_2 n_2 \frac{D}{N} + \pi\left(\frac{D}{N} + f'_s t\right)\right],$$

and B may be expressed by $$2\pi\left[1 - \cos\left[2\pi(s_1 n_1 - s_2 n_2)\frac{D}{N}\right]\left[\frac{D}{N} + f'_s t\right]\right].$$

$$h_B(t) = A/B \qquad (12)$$

Herein, A may be expressed by $$\sin(\pi f'_s t) + \sin\left(2\pi(s_1 n_1 - s_2 n_2)\frac{D}{N}\right) - \sin\left[\pi f'_s t + 2\pi(s_1 n_1 - s_2 n_2)\frac{D}{N}\right],$$

and B may be expressed by:

$$2\pi\left[1 - \cos\left[2\pi(s_1 n_1 - s_2 n_2)\frac{D}{N}\right]\right] f'_s t.$$

The impulse response $h_A(t)$ of the first digital filter 615 and the impulse response $h_B(t)$ of the second digital filter 616 may be implemented by a digital filter having a operating speed of $f'_s$ (=$f_s/N$). A coefficient of a digital filter may be re-calculated according to RF frequency bands of two signals, and the digital filter may be reconfigured using the re-calculated filter coefficient. As a result, dual band signals at any frequency band may be received at the same time. Further, as understood from the above equations 11 and 12, a condition of $$(s_1 n_1 - s_2 n_2)\frac{D}{N} \neq m$$

(m being an integer) must be satisfied. To this end, values of $f_s$, D, and N may be changed to satisfy the condition of $$(s_1 n_1 - s_2 n_2)\frac{D}{N} \neq m.$$

Figure 19:
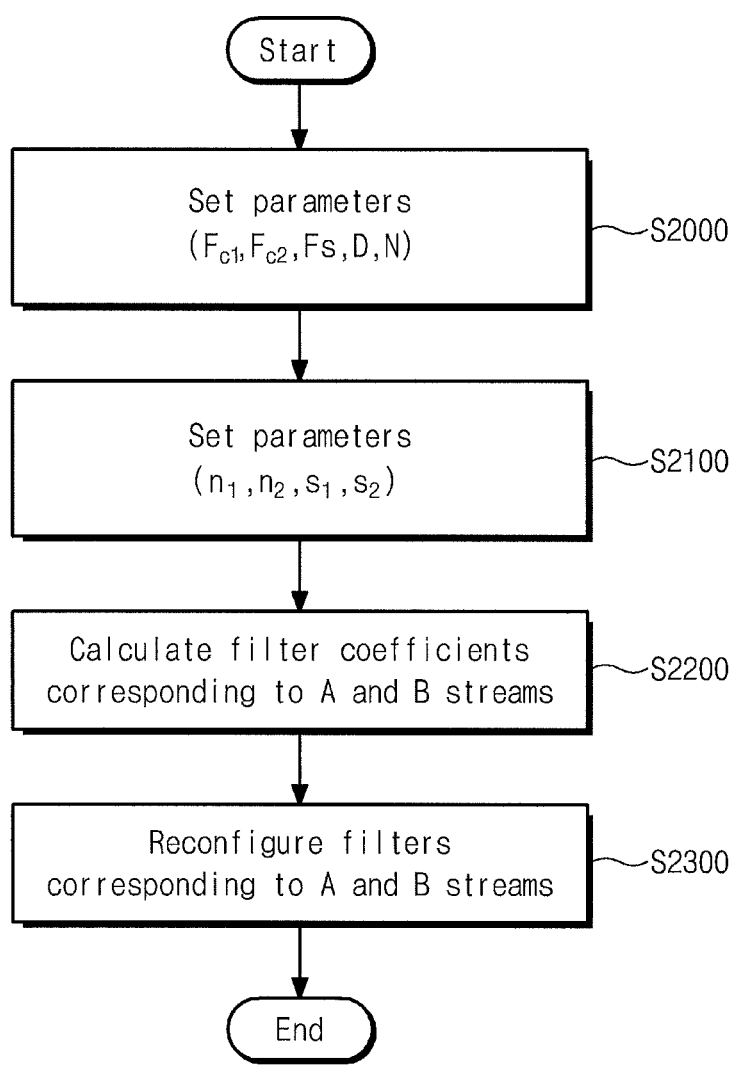
FIG. 19 is a flowchart illustrating a reconfiguring method of a digital filter of a dual band receiver according to an exemplary embodiment of the inventive concept.

Reconfiguration of a digital filter of the inventive concept may be more fully described in relation to FIG. 19.

In a case wherein a condition of $$(s_1 n_1 - s_2 n_2)\frac{D}{N} = \frac{k}{2}$$

(k being a positive integer) is satisfied, the equation 9-1 to 9-3 and 10-1 to 10-3 may be rewritten by the following equations.

$$H_A(f') = \left\{-Ce^{-\frac{j2\pi s_2 n_2 D}{N}} e^{\frac{j2\pi D f}{N f'_s}} / f'_s\right\}, -\frac{f'_s}{2} < f < 0 \qquad (13\text{-}1)$$

$$H_A(f') = \left\{-Ce^{-\frac{j2\pi s_2 n_2 D}{N}} e^{\frac{j2\pi D f}{N f'_s}} / f'_s\right\}, 0 < f < \frac{f'_s}{2} \qquad (13\text{-}2)$$

$$H_A(f') = 0, \text{ otherwise} \qquad (13\text{-}3)$$

$$H_B(f') = C/f'_s, -\frac{f'_s}{2} < f < \frac{f'_s}{2} \qquad (14)$$

Herein, $C = 1/\sqrt{2\{1-\cos(2\pi(s_1 n_1 - s_2 n_2)D/N\}} = \frac{1}{2}$.

An impulse response $h_A(t)$ of the first digital filter 615 expressed by the following equation 16 may be obtained by inverse Fourier transforming the above equation 13-1, 13-2, or 13-3 corresponding to a frequency response of the first digital filter 615, and an impulse response $h_B(t)$ of the second digital filter 616 expressed by the following equation 16 may be obtained by inverse Fourier transforming the above equation 14 corresponding to a frequency response of the second digital filter 616.

$$h_A(t) = \qquad (15)$$
$$C\left\{\sin\left(2\pi s_2 n_2 \frac{D}{N}\right) - \sin\left[\left(2\pi s_2 n_2 \frac{D}{N}\right) + \pi\left(\frac{D}{N} + f'_s(t)\right)\right]\right\} / \pi\left(\frac{D}{N} + f'_s(t)\right)$$

$$h_B(t) = C(\sin \pi f'_s(t)/\pi f'_s(t)) \qquad (16)$$

Herein, $C=1/(\sqrt(2\{1-\cos [(2\pi [ [(s] _1 n] _1 - s] _2 n] _2) D/N\} ])=\frac{1}{2})$.

Since an operating speed of the second digital filter 616 expressed by the equation 16 is $f_s'$, an impulse response $h_B(t)$ of the second digital filter 616 may have a constant C when t=0 and a value of 0 when t≠0. Accordingly, the second digital filter 616 may be replaced with a sample delay and a gain adjustment logic providing a gain of C (refer to FIGS. 14 to 17). Herein, a sample delay operation of the sample delay may be performed to compensate a delay time from a time where a first down sampler 611 outputs a down sampling result to a time where the first digital filter 615 outputs a filtering result signal.

A technique of designing the first and second digital filters 615 and 616 is described using an example that the first signal extract 61_1 removes a second baseband signal $DR_2$ to obtain the first baseband signal $DR_1$.

However, the first signal extract 61_1 can remove the first baseband signal $DR_1$ to extract the second baseband signal $DR_2$. In this case, the first and second digital filters 615 and 616 may be designed to satisfy the following equation 17.

$$S(f) = S_A^{\delta}(f) + S_B^{\delta}(f) = R_{2-}(f) + R_{2+}(f) \qquad (17)$$

A digital filter designing method, in which the first signal extractor 61_1 removes the first baseband signal $DR_1$ to extract the second baseband signal $DR_2$, may be identical to that, in which the first signal extractor 61_1 removes the second baseband signal $DR_2$ to extract the first baseband signal $DR_1$, expressed by the equations 9 to 16, and description thereof is thus omitted.

Accordingly, if the first and second digital filters 615 and 616 are designed to satisfy the above equation 17, the first signal extractor 61_1 may extract the second baseband signal $DR_2$, and the second signal extractor 62 may extract the first baseband signal $DR_1$.

Figure 10:
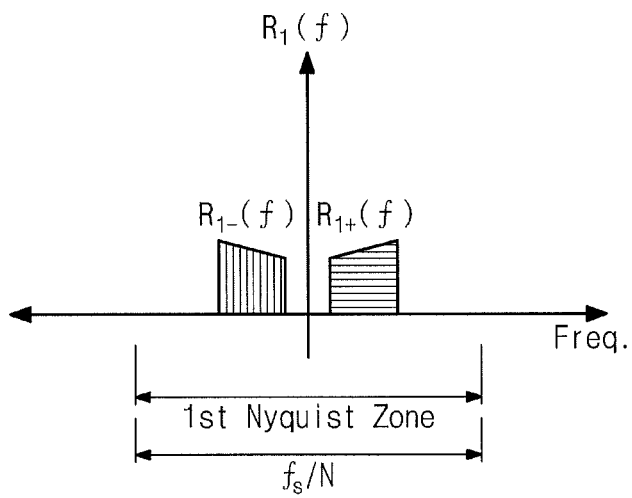
FIG. 10 is a diagram illustrating a spectrum of a first baseband signal output from an adder illustrated in FIG. 4.
Figure 11:
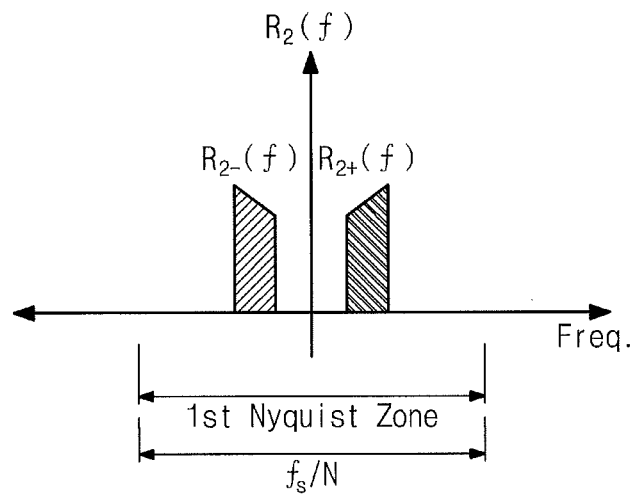
FIG. 11 is a diagram illustrating a spectrum of a first baseband signal output from a subtractor illustrated in FIG. 4.

FIG. 10 is a diagram illustrating a spectrum of a first baseband signal output from an adder illustrated in FIG. 4. FIG. 11 is a diagram illustrating a spectrum of a first baseband signal output from a subtractor illustrated in FIG. 4.

Referring to FIGS. 4 and 10, a second baseband signal $DR_2$ may be removed from an output of a first signal extractor 61_1 by adding a filtering result of a first path signal $DR_A$ passing through a first digital filter 615 and a filtering result of a second path signal $DR_B$ passing through a second digital filter 616 via an adder 619. Accordingly, the first baseband signal $DR_1$ may remain as an output signal of the first signal extractor 61_1.

Referring to FIGS. 4 and 11, a second signal extractor 62 may be configured to include a second delay 620 and a subtractor 629.

The second delay 620 may receive a second path signal $DR_B$ from a second down sampler 612 of the first signal extractor 61_1 to delay it by Q sample. A sample delay operation of the second delay 620 may be made to compensate a delay time from a time when the first down sampler 611 (or, a second down sampler 612) outputs a down sampling result to a time when the adder 619 outputs the first baseband signal $DR_1$. That is, a sample delay value Q of the second delay 629 may be determined according to a time taken to extract the first baseband signal $DR_1$ from the first path signal $DR_A$ (or, the second path signal $DR_B$).

An output signal of the second delay 620 may be a signal obtained by Q sample delaying the second path signal $DR_B$ being an output signal of the second down sampler. The second path signal $DR_B$ may include the first baseband signal $DR_1$ and the second baseband signal $DR_2$. Accordingly, the subtractor 629 may acquire the second baseband signal $DR_2$ by subtracting the first baseband signal $DR_1$ extracted by the first signal extractor 61_1 from the delayed signal $DR_{B\_D}$ of the second path signal $DR_B$.

An embodiment of the above-described dual band receiver may be related to the case that the first signal extractor 61_1 uses the adder 619 to extract the first or second baseband signal $DR_1$ or $DR_2$. In another embodiment, the adder 619 can be replaced with a subtractor to extract the first or second baseband signal $DR_1$ or $DR_2$ using the first signal extractor 61_1. In this case, in order to extract the first or second baseband signal $DR_1$ or $DR_2$ using the first signal extractor 61_1, the first and second digital filters 615 and 616 may be designed to satisfy the following equations 18 and 19.

$$S(f)=S_A^{\delta}(f)-S_B^{\delta}(f)=R_{1-}(f)+R_{1+}(f) \quad (18)$$

$$S(f)=S_A^{\delta}(f)-S_B^{\delta}(f)=R_{2-}(f)+R_{2+}(f) \quad (19)$$

Herein, the equation 18 may correspond to the case that the first signal extractor 61_1 removes the second baseband signal $DR_2$ to extract the first baseband signal $DR_1$. The equation 19 may correspond to the case that the first signal extractor 61_1 removes the first baseband signal $DR_1$ to extract the second baseband signal $DR_2$.

The above-described design method of the first and second digital filters 615 and 616 according this embodiment may be identical to that expressed by the equations 3 to 16, and description thereof is thus omitted.

Figure 12:
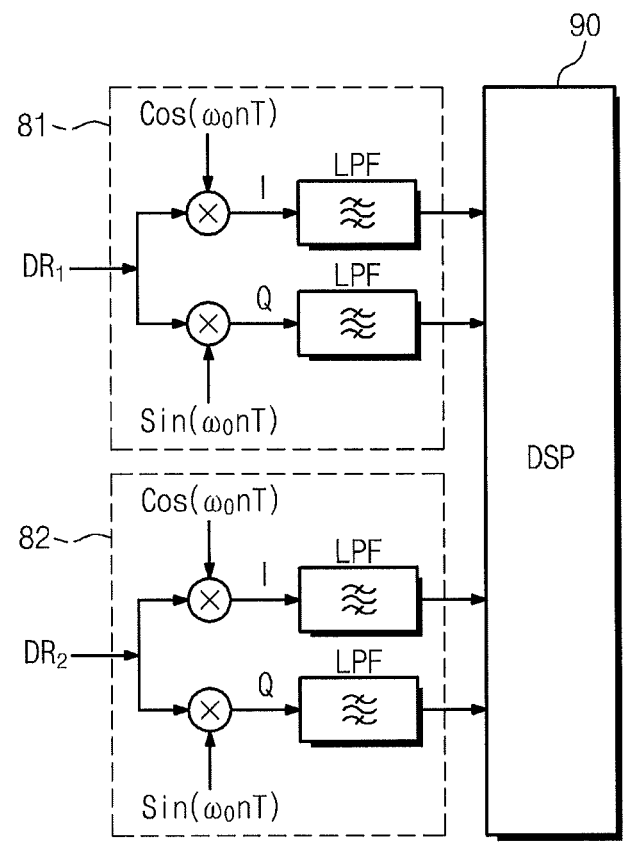
FIG. 12 is a diagram illustrating first and second digital up/down converters 81 and 82 according to an exemplary embodiment of the inventive concept.

FIG. 12 is a diagram illustrating first and second digital up/down converters 81 and 82 according to an exemplary embodiment of the inventive concept.

Referring to FIGS. 1 and 12, a first baseband signal $DR_1$ extracted by a first signal extractor 61_1 may be provided as an input signal of a first digital up/down converter 81, and the first digital up/down converter 81 may convert the first baseband signal $DR_1$ into a first complex signal.

A second baseband signal $DR_2$ extracted by a second signal extractor 62 may be provided as an input signal of a second digital up/down converter 82, and the second digital up/down converter 82 may convert the second baseband signal $DR_2$ into a second complex signal.

Referring to FIG. 12, the first and second digital up/down converters 81 and 82 may be configured to perform a digital up/down conversion operation and a low pass filtering operation, respectively.

The digital up/down conversion operation on a first baseband signal $s_1(t)$ may be expressed by the following equation 20, and may be followed by the low pass filtering operation. And the digital up/down conversion operation on a second baseband signal $s_2(t)$ may be expressed by the following equation 21, and may be followed by the low pass filtering operation.

$$r_1(t)=s_1(t)\cos(2\pi s_1 f_{if_1} t)-js_1(t)\sin(2\pi s_1 f_{if_1} t) \quad (20)$$

$$r_2(t)=s_2(t)\cos(2\pi s_2 f_{if_2} t)-js_2(t)\sin(2\pi s_2 f_{if_2} t) \quad (21)$$

Herein, $s_1$ and $s_2$ may indicate signs determined according to whether spectrums of the first and second baseband signals $DR_1$ and $DR_2$ are inverted. $f_{if_1}$ and $f_{if_2}$ may be expressed by the following equations 22 and 23, respectively.

$$f_{if_1}=f_{c1}-n_1 f_s' \quad (22)$$

$$f_{if_2}=f_{c2}-n_2 f_s' \quad (22)$$

With the digital up/down conversion operations of the first and second digital up/down converters 81 and 82 expressed by the equations 20 and 21, the first and second baseband signals $DR_1$ and $DR_2$ may be converted into the first and second complex signals, respectively. Image components of the first and second complex signals may be removed by digital low pass filtering, respectively, and resultant signals may be provided to a digital signal processor 90.

The above-described dual band signal extracting unit 60_1 is not limited to this disclosure. In particular, a first signal extractor 61_1 extracting a first baseband signal DR1 may be modified or changed variously. Various embodiments of the dual band signal extracting unit 60_1 and the first signal extractor 61_1 will be more fully described below.

Figure 13:
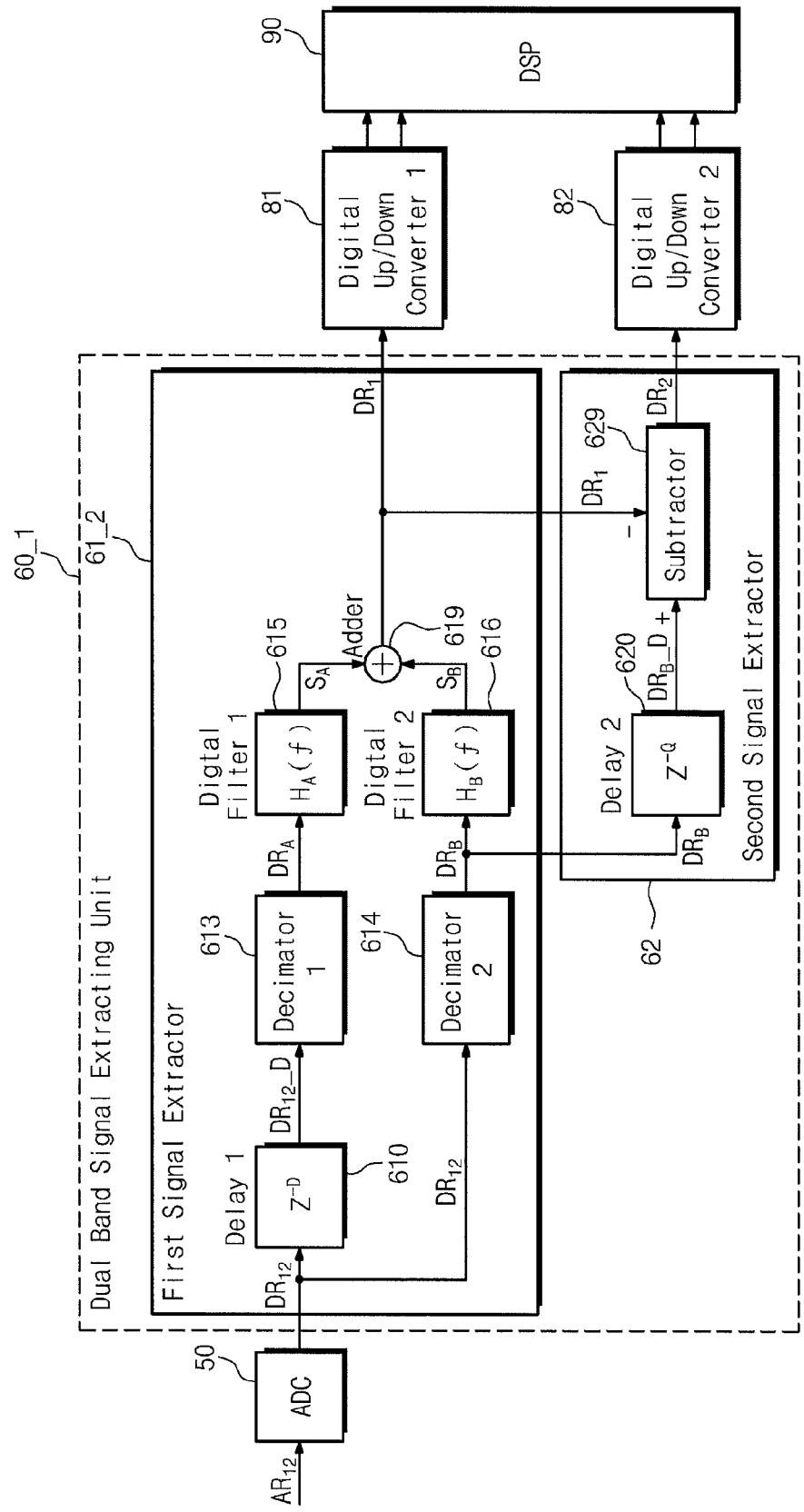
FIG. 13 is a diagram illustrating a first signal extractor and a dual band signal extracting unit according to another exemplary embodiment of the inventive concept.

FIG. 13 is a diagram illustrating a first signal extractor and a dual band signal extracting unit according to another exemplary embodiment of the inventive concept.

Referring to FIG. 13, a first down sampler 611 in FIG. 4 may be replaced with a first decimator 613, and a second down sampler 612 in FIG. 4 may be replaced with a second decimator 614. The first and second decimators 613 and 614 may be formed of a pre-digital filter and a down sampler, and may adjust a sample rate of an output signal so as to become 1/N to an input signal (N being an integer of 2 or more). Pre-filtering and down sampling operations of the first and second decimators 613 and 614 may correspond to down sampling operations of the first and second down samplers 611 and 612.

In FIG. 13, the remaining elements of the first signal extractor 61_2 other than the first and second decimators 613 and 614 may be identical to those in FIG. 4. The remaining elements of the dual band signal extracting unit 60_2 other than the first and second decimators 613 and 614 may be identical to those in FIG. 4, and description thereof is thus omitted.

Figure 14:
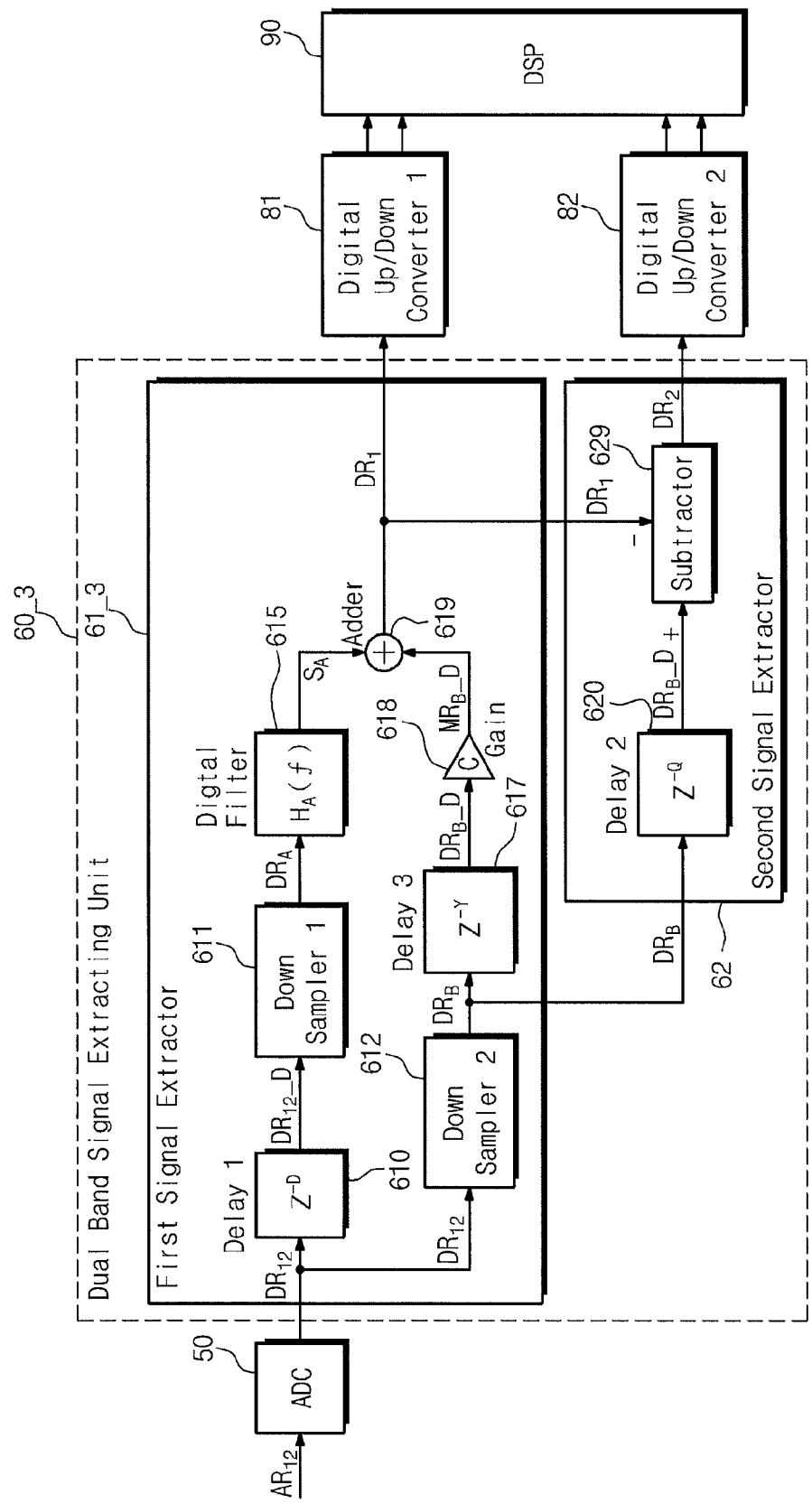
FIGS. 14 and 15 are diagrams illustrating a first signal extractor and a dual band signal extracting unit according to other exemplary embodiments of the inventive concept.
Figure 15:
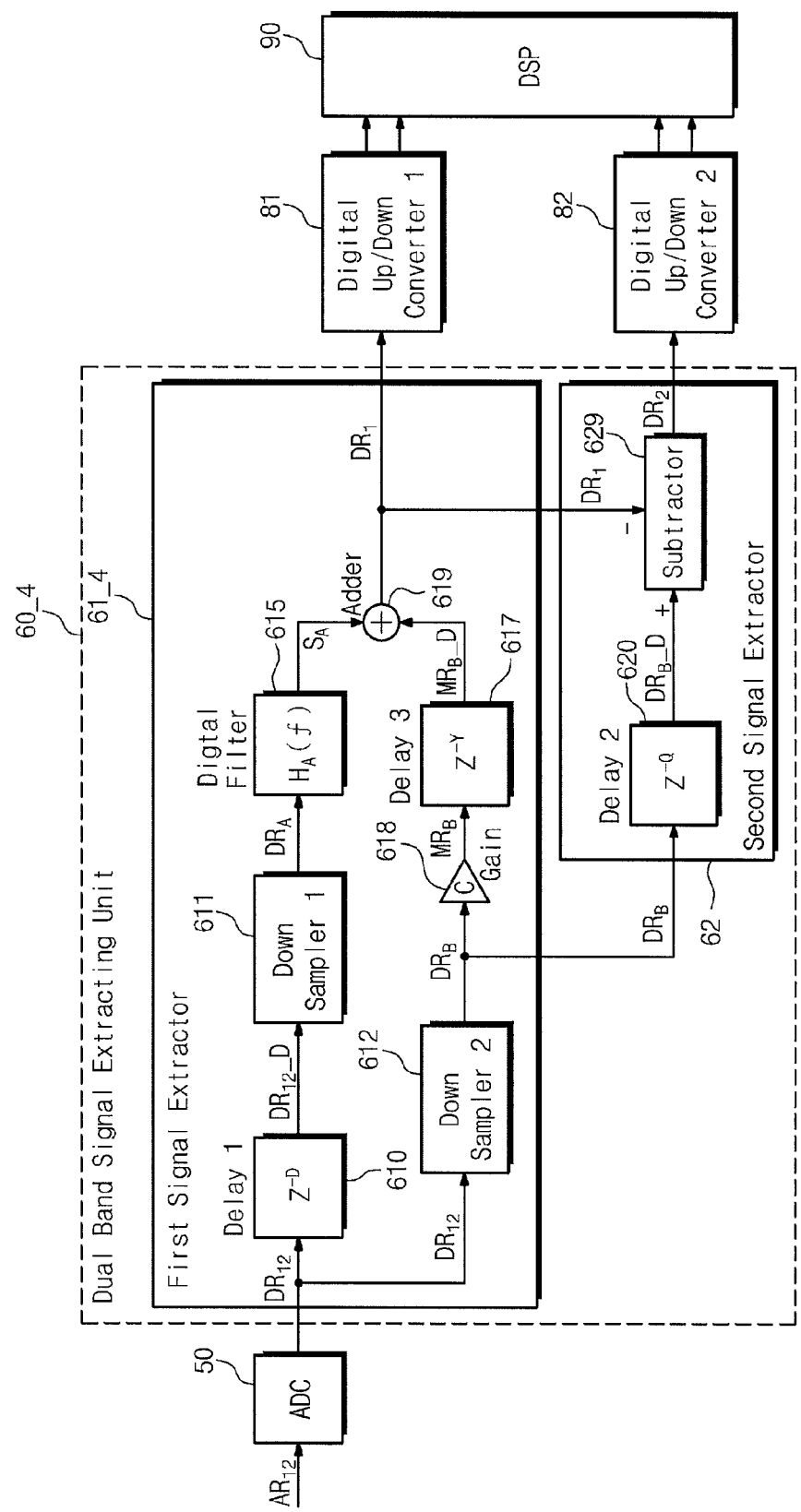

FIGS. 14 and 15 are diagrams illustrating a first signal extractor and a dual band signal extracting unit according to other exemplary embodiments of the inventive concept.

Referring to FIGS. 14 and 15, a second digital filter 616 in FIG. 4 can be replaced with a third delay and gain adjustment logic 618 providing a predetermined gain. The third delay 617 may be configured to delay a second path signal $DR_B$ by Y sample. A sample delay operation of the third delay 617 may be made to compensate a delay time from a time when a first down sampler 611 outputs a down sampling result to a time when a first digital filter 615 outputs a filtering result signal. In this case, a time taken when the first digital filter 615 outputs a filtering result signal may correspond to a time taken at a filtering operation of the first digital filter 615. Accordingly, a sample delay value Y of the third delay 617 may be determined according to a time taken at a filtering operation of the first digital filter 615 of a first signal extractor 61_1. For example, in a case where the first digital filter 615 of the first signal extractor 61_1 is implemented by a FIR filter having a length of L, a FIR filtering operation may cause a time delay by $$\left\lfloor \frac{L}{2} \right\rfloor,$$

so that a sample delay value is determined to become $$\left\lfloor \frac{L}{2} \right\rfloor.$$

Herein, $\lfloor X \rfloor$ may mean the largest integer of an integer less than X. The gain adjustment logic 618 may provide a gain of C to a sample delay result $DR_B\_D$ of the third delay 617. An output signal $MR_B\_D$ of the gain adjustment logic 618 may be provided to an adder 619. A second baseband signal component $R_{2-}(f)$ and $R_{2+}(f)$ may be removed from an output of the first signal extractor 61_3 by adding a filtering result $S_A$ of the first digital filter 615 and the output signal $MR_B\_D$ of the gain adjustment logic 618 using the adder 619, and a first baseband signal component $R_{1-}(f)$ and $R_{1+}(f)$ may remain as an output signal of the first signal extractor 61_3.

Interconnection of the third delay 617 and the gain adjustment logic 618 is not limited to a specific shape, and can be changed to be exchanged mutually as illustrated in FIGS. 14 and 15.

In a case where the first signal extractor 61_3/61_4 has the third delay 617 and the gain adjustment logic 618 instead of a second digital filter 616, a circuit structure may become more simple. This may mean that a size and a fabrication cost of a receiver are reduced.

In FIGS. 14 and 15, the remaining elements of the first signal extractor 61_3/61_4 other than the third delay 617 and the gain adjustment logic 618 may be identical to that 61_1 in FIG. 4. Therefore, the remaining elements of a dual band signal extracting unit 60_3/60_4 other than the third delay 617 and the gain adjustment logic 618 may be identical to those in FIG. 4, and description thereof is thus omitted.

Figure 16:
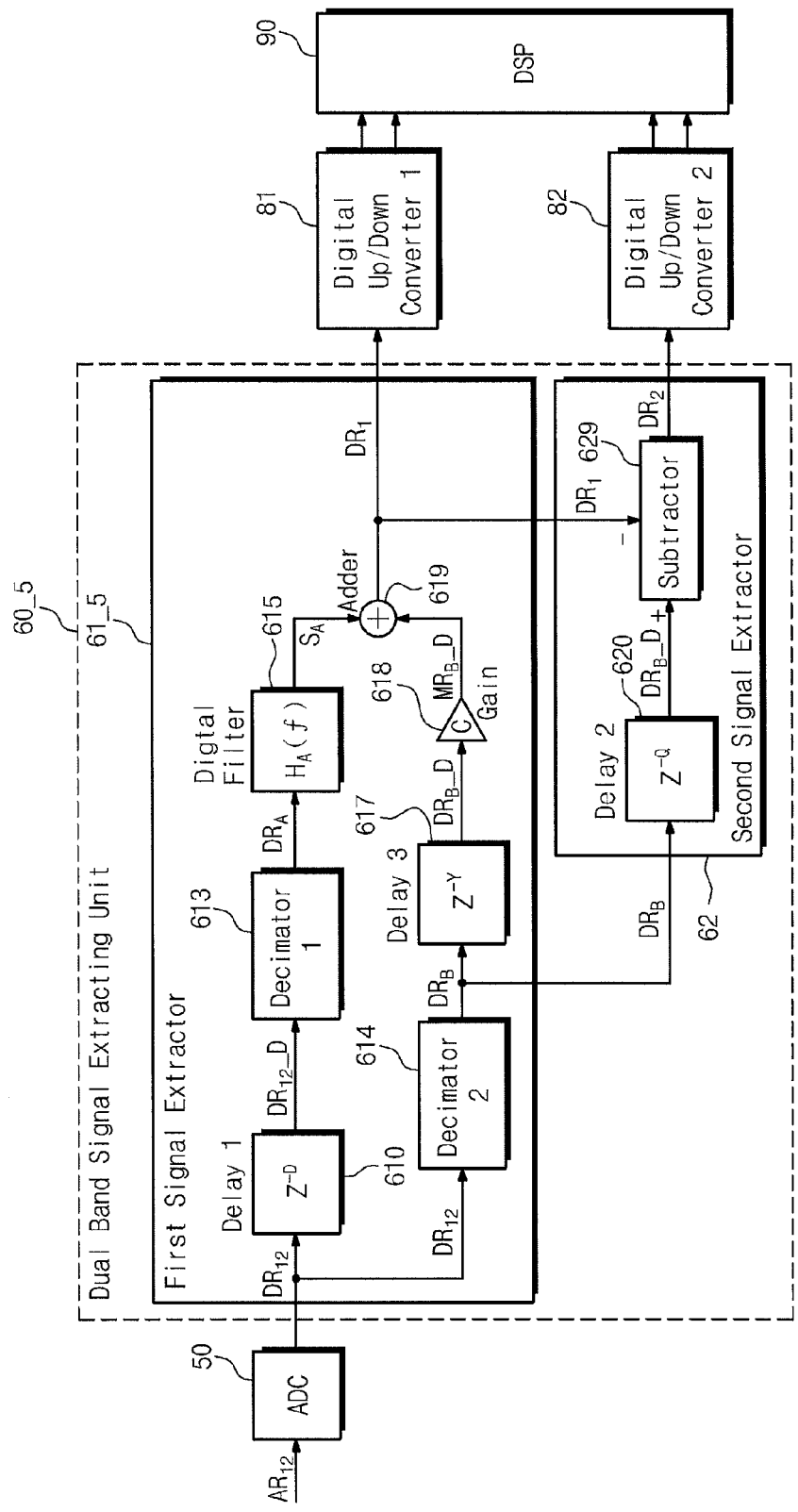
FIGS. 16 and 17 are diagrams illustrating a first signal extractor and a dual band signal extracting unit according to still other exemplary embodiments of the inventive concept.
Figure 17:
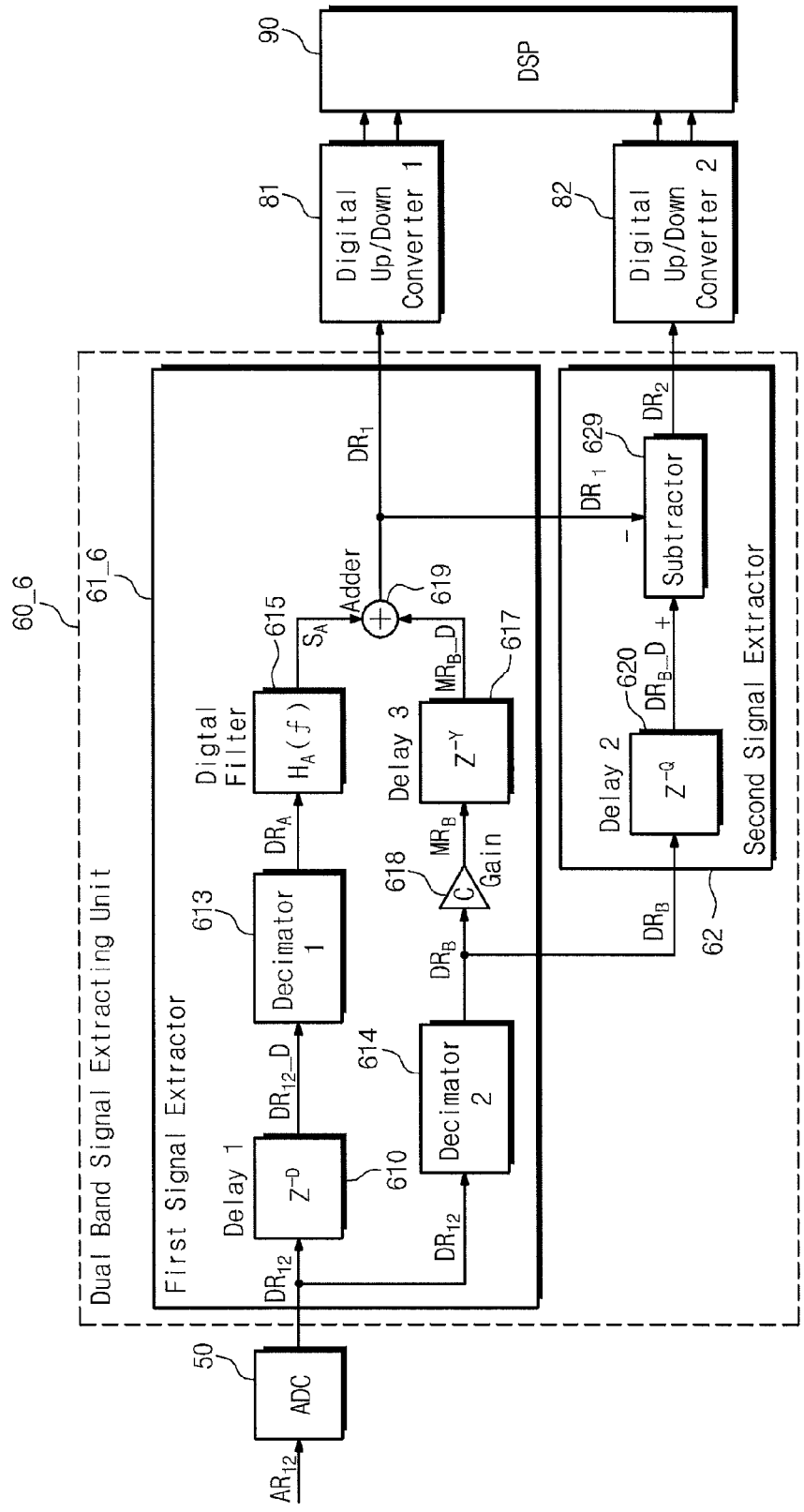

FIGS. 16 and 17 are diagrams illustrating a first signal extractor and a dual band signal extracting unit according to still other exemplary embodiments of the inventive concept.

Referring to FIGS. 16 and 17, a first down sampler 611 in FIG. 4 may be replaced with a first decimator 613, and a second down sampler 612 in FIG. 4 may be replaced with a second decimator 614. The first and second decimators 613 and 614 may be formed of a pre-digital filter and a down sampler, and may adjust a sample rate of an output signal so as to become 1/N to an input signal (N being an integer of 2 or more). Pre-filtering and down sampling operations of the first and second decimators 613 and 614 may correspond to down sampling operations of the first and second down samplers 611 and 612.

A second digital filter 616 in FIG. 4 may be replaced with a third delay 617 and gain adjustment logic 618 providing a gain corresponding to a constant C.

Interconnection of the third delay 617 and the gain adjustment logic 618 is not limited to a specific shape, and can be changed to be exchanged mutually as illustrated in FIGS. 16 and 17.

In FIGS. 16 and 17, the remaining elements of a first signal extractor 61_5/61_6 other than the third delay 617 and the gain adjustment logic 618 may be identical to that 61_1 in FIG. 4. Therefore, the remaining elements of a dual band signal extracting unit 60_5/60_6 other than the third delay 617 and the gain adjustment logic 618 may be identical to those in FIG. 4, and description thereof is thus omitted.

Figure 18:
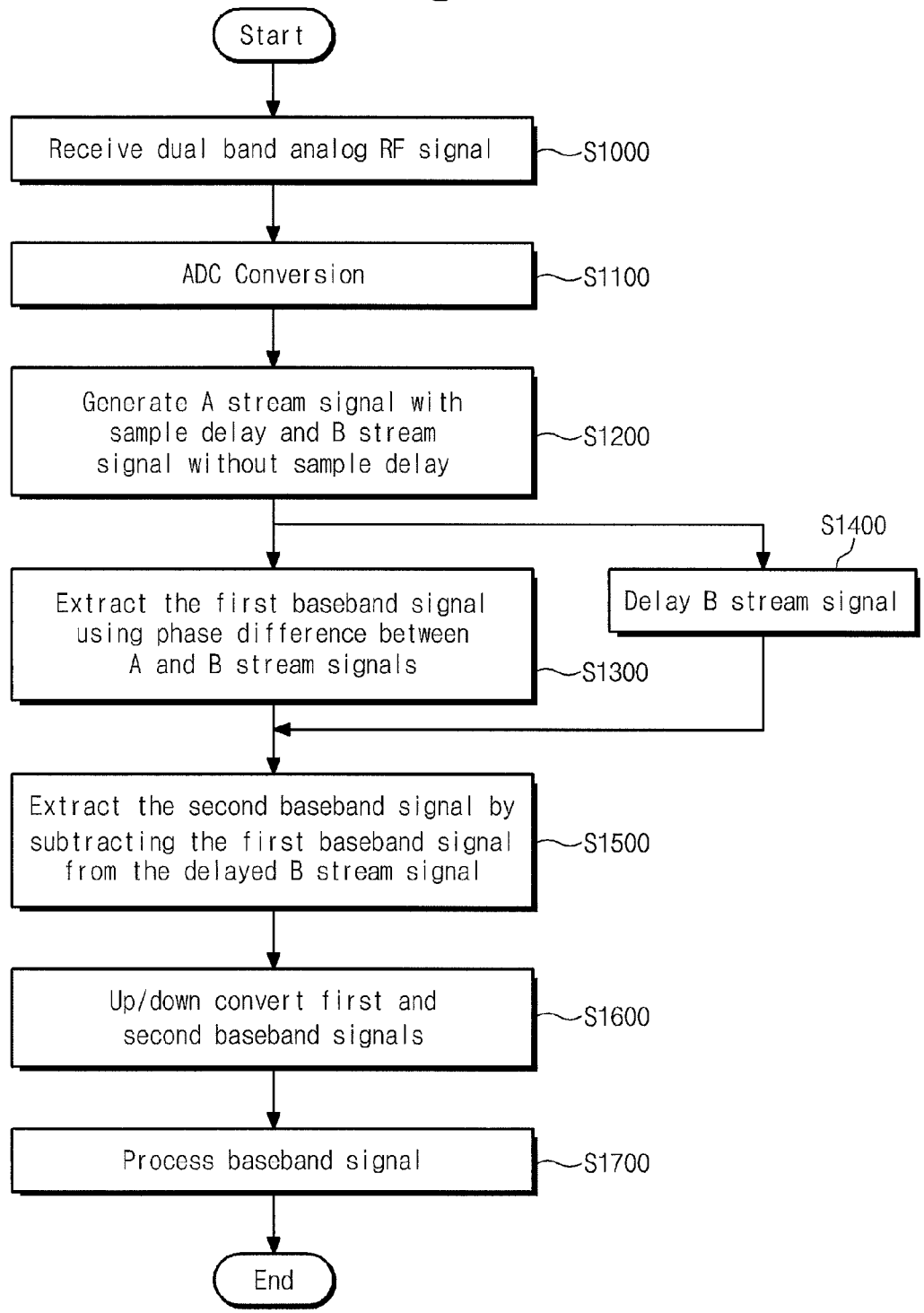
FIG. 18 is a flowchart illustrating a dual baseband signal extracting method of a dual band receiver according to an exemplary embodiment of the inventive concept.

FIG. 18 is a flowchart illustrating a dual baseband signal extracting method of a dual band receiver according to an exemplary embodiment of the inventive concept. A dual baseband signal extracting method illustrated in FIG. 18 may be applied to dual band signal extracting units 60 and 60_1 to 60_6 and dual band receivers 100, 100_1, and 100_2 including the same.

Referring to FIG. 18, a dual band receiver 100/100_1/100_2 according to the inventive concept may receive an analog RF signal via an antenna 10. The received analog RF signal may include at least two or more analog RF signals. A first band pass filter 21 may be designed such that a pass band is limited to a first bandwidth B1. The first band pass filter 21 may generate a first analog RF signal $AR_1$ having the first bandwidth B1 and a first carrier frequency $f_{c1}$, as a filtering result. A second band pass filter 22 may be designed such that a pass band is limited to a second bandwidth B2. The second band pass filter 22 may generate a second analog RF signal $AR_2$ having the second bandwidth B2 and a second carrier frequency $f_{c2}$, as a filtering result. Filtering results of the first and second band pass filters 21 and 22 may be added by an adder 30 such that a dual band analog RF signal $AR_{12}$ is generated. The above-described operations may be performed in step S1000.

In step S1100, the dual band analog RF signal $AR_{12}$ may be converted into a dual baseband digital signal $DR_{12}$ via an ADC 50.

In step S1200, a first signal extractor 61/61_1 to 61_6 in a dual band signal extracting unit 60/60_1 to 60_6 may generate a first path signal $DR_A$, being sample delayed, and a second path signal $DR_B$, being not sample delayed, from the dual baseband digital signal $DR_{12}$. In an embodiment, the first path signal $DR_A$ may be generated by sample-delaying an output signal $DR_{12}$ of the ADC 50 via a first delay 610 and down-sampling it via a first down sampler 611. The second path signal $DR_B$ may be generated by down-sampling the output signal $DR_{12}$ of the ADC 50 without sample delay. Herein, the first and second down sampler 611 and 612 may perform down sampling operations such that a sample rate becomes 1/N, and a sample rate $f_S$ of each of the first and second path signals $DR_A$ and $DR_B$ output from the first and second down samplers 611 and 612 may be $f_S/N$. With the above description, a sample delay difference of D/N may exist between the first and second path signals $DR_A$ and $DR_B$ output from the first and second down samplers 611 and 612.

In an embodiment, the first and second down samplers 611 and 612 can be replaced with first and second decimators 613 and 614 (refer to FIGS. 13, 16, and 17) such that a sample rate of an output signal is adjusted to become 1/N to an input signal via a pre-filtering and a down sampling operation.

The first path signal $DR_A$ generated from the first down sampler 611 may be provided to a first digital filter 615. The second path signal $DR_B$ generated from the second down sampler 612 may be provided to a second digital filter 616 (or, a third delay 617) and a second delay 620 of a second signal extractor.

In step S1300, the first signal extractor 61/61_1 to 61_6 may extract a first baseband signal $DR_1$ using a phase difference (i.e., corresponding to a sample delay difference of D/N) generated from a relative sample delay between the first and second path signals $DR_A$ and $DR_B$. Extraction of the first baseband signal $DR_1$ may be made by a first digital filter 615, a second digital filter 616 (or, a third delay 617 and gain adjustment logic 618), and an adder 619 of the first signal extractor 61/61_1 to 61_6. The first and second digital filters 615 and 616 may be implemented by a Finite Impulse Response (FIR) filter. The second digital filter 616 can be replaced with the third delay 617 and the gain adjustment logic 618 (refer to FIGS. 14 to 17). A second baseband signal component $R_{2-}(f)$ and $R_{2+}(f)$ may be removed from an output of the first signal extractor 61/61_1 to 61_6 by adding a filtering result $S_A$ of the first digital filter 615 and a filtering result $S_B$ of the second digital filter 616 (in case of FIGS. 14 to 17, an output of the gain adjustment logic 618 instead of the filtering result $S_B$ of the second digital filter 616) via the adder 619. As a result, a first baseband signal component $R_{1-}(f)$ and $R_{1+}(f)$ may remain as an output signal of the first signal extractor 61_3.

While the first baseband signal $DR_1$ is extracted in step S1300, in step S1400, the second signal extractor 62 may Q sample delay the second path signal $DR_B$ via a second delay 620. The Q sample delay operation of the second delay 620 may be performed to compensate a delay time from a time when a first down sampler 611 outputs the first and second path signals $DR_A$ and $DR_B$ and a time when the first adder 619 outputs the first baseband signal $DR_1$. Herein, an output signal $DR_{B\_D}$ of the second delay 620 may be a Q sample delayed version of the second path signal $DR_B$. The output signal $DR_{B\_D}$ of the second delay 620 may include the baseband signal component $R_{1-}(f)$ and $R_{1+}(f)$ and the second baseband signal component $R_{2-}(f)$ and $R_{2+}(f)$.

Accordingly, in step S1500, a second baseband signal $DR_2$ may be acquired by subtracting the first baseband signal $DR_1$ being an output signal of the first signal extractor 61_3 from the output signal $DR_{B\_D}$ of the second delay 620. This may be made by a subtractor 629 included in the second signal extractor 62.

The first baseband signal $DR_1$ extracted in step S1300 and the second baseband signal $DR_2$ extracted in step S1500 may be provided to first and second digital up/down converters 81 and 82, respectively such that digital up/down conversion is made. This may be made in step S1600. In step S1700, digital up/down conversion results of the first baseband signal $DR_1$ and the second baseband signal $DR_2$ may be provided to a digital signal processor 90 such that baseband signal processing is made (e.g., demodulation).

With the dual baseband signal extracting method of a dual band receiver of the inventive concept, although the first and second baseband signals $DR_1$ and $DR_2$ are aliased at a baseband, such aliasing may be removed, and the first and second baseband signals $DR_1$ and $DR_2$ may be extracted perfectly. Accordingly, it is possible to simultaneously receive dual band signals with respect to all signals having any frequency band and a signal bandwidth using the dual band receiver according to the inventive concept.

A dual band and a dual mode may be supported using a single receiver circuit without including an independent receiver circuit every frequency band or communication mode. The excellent performance may be provided from various aspects such as a fabrication cost, power consumption, a receiver size, and an integration as compared with a general receiver where a receiver circuit is replaced according to a frequency band and a communication mode and an independent receiver circuit is implemented every band and communication mode to support a dual band and a dual mode.

The dual band receiver according to the inventive concept may receive at least two or more signals having any frequency band and signal bandwidth using a single receiver circuit. Further, in case of a communication manner such as a cognitive radio communication system, it is possible to provide a function of receiving any frequency band signal and at the same time scanning whether a signal exists at another frequency band.

The inventive concept is exemplarily described using such a case that first and second baseband signals are all extracted. However, the number of baseband signals received by the dual band receiver of the inventive concept can be changed. For example, the dual band receiver of the inventive concept may be configured to selectively extract at least one baseband signal from an input signal including at least two or more signals. In this case, first and second digital filters 615 and 616 and an adder 619 may provide a function of selectively extracting at least one baseband signal.

FIG. 19 is a flowchart illustrating a reconfiguring method of a digital filter of a dual band receiver according to an exemplary embodiment of the inventive concept. A reconfiguring method of a digital filter illustrated in FIG. 19 may be applied to dual band signal extracting units 60 and 60_1 to 60_6 and dual band receivers 100, 100_1, and 100_2 including the same.

The dual band receiver according to the inventive concept is not limited to a signal of a specific frequency band. That is, the dual band receiver according to the inventive concept may receive two RF signals at any frequency band. Functions of first and second digital filters 615 and 616 expressed by the equations 9 to 16 may be determined according to frequency bands (or, carrier frequencies) of two analog RF signals. Accordingly, the digital filters 615 and 616 may be flexibly reconfigured such that the dual band receiver according to the inventive concept may receive any frequency band signal.

Filter coefficients of the first and second digital filters 615 and 616 may be re-calculated when at least one of a sample rate of an ADC 50, frequency band location indexes of first and second analog RF signals, a sample delay value of a first delay 610, down sample rates of first and second down samplers 611 and 612, and signs determined according to inversion of spectrums of first and second baseband signals $DR_1$ and $DR_2$ is changed. The digital filters 615 and 616 may be flexibly reconfigured according to the re-calculated digital filter coefficients of the first and second digital filters 615 and 616.

Referring to FIG. 19, in step S200, filtering parameters, that is, the first and second carrier frequencies $f_{c1}$ and $f_{c2}$, a sample rate $f_S$, a sample delay value D of the first delay 610, and down sample rates N of the first and second down samplers 611 and 612 may be established.

Herein, the first carrier frequency $f_{c1}$ may indicate a carrier frequency of the first analog RF signal $AR_1$ constituting a dual band analog RF signal $AR_{12}$. The second carrier frequency $f_{c2}$ may indicate a carrier frequency of the second analog RF signal $AR_2$ constituting the dual band analog RF signal $AR_{12}$. The sample rate $f_S$ may mean a sample rate when the dual band analog RF signal $AR_{12}$ is converted to a dual baseband digital signal $DR_{12}$ via an ADC 50.

A dual band signal extracting unit 60 may extract a first baseband signal $DR_1$ and a second baseband signal $DR_2$ from the ADC 50 output signal. The dual band signal extracting unit 60 may include a first signal extractor 61, which extracts the first baseband signal $DR_1$ from the dual band analog RF signal $AR_{12}$, and a second signal extractor 62 which extracts the second baseband signal $DR_2$ in response to the first baseband signal $DR_1$ extracted by the first signal extractor 61.

The first signal extractor 61 may generate a first path signal $DR_A$, being sample delayed, and a second path signal $DR_B$, being not sample delayed, from the dual band analog RF signal $AR_{12}$ provided from the ADC 50.

The first delay 610 may delay the dual base band signal $DR_{12}$ by D sample, to generate a delayed signal $DR_{12\_D}$. The delayed signal $DR_{12\_D}$ may be down-sampled such that a sample rate becomes 1/N via the first down sampler 611. As a result, the first path signal $DR_A$ may be generated. The first path signal $DR_A$ may be provided to the first digital filter 615. Herein, N may be an integer more than 1, and a sample delay D may have an integer value larger than 0 and smaller than a down sample rate N.

The dual baseband signal $DR_{12}$, which does not pass through the first delay 610, may be down-sampled such that a sample rate becomes 1/N via the second down sampler 612. As a result, the second path signal $DR_B$ may be generated. The second path signal $DR_B$ may be provided to the second signal extractor 62 and the second digital filter 616.

Herein, a sample rate $f_S$ of each of the first and second path signals $DR_A$ and $DR_B$ may be $f_S/N$. With the above-described configuration, a relative sample delay difference of D/N (i.e., a relative time delay difference of $D/(Nf_S')$ may exist between the first and second path signals $DR_A$ and $DR_B$ output from the first and second down samplers 611 and 612.

In step S2100, parameters $n_1$, $n_2$, $s_1$, and $s_2$ to be applied to the first and second digital filters 615 and 616 may be calculated.

Herein, $n_1$ and $n_2$ may be frequency band location indexes of first and second analog RF signals, and may have a integer value. The $n_1$ and $n_2$ may be calculated based upon the above equations 1 and 2. $s_1$ and $s_2$ may indicate signs determined whether spectrums of the first and second baseband signals are inverted. $s_1$ and $s_2$ may have a sign of −1 when a spectrum is inverted and a sign of +1 when no spectrum is inverted. Accordingly, ($s_1$, $s_2$) may be one of four cases, that is, (+1, +1), (+1, −1), (−1, +1), and (−1, −1), which correspond to spectrums illustrated in FIGS. 5, 7, 8, and 9, respectively.

After parameters are established and calculated, in step S2200, coefficients of the first and second digital filters 615 and 616 may be calculated using the calculated parameters. Coefficients of the first and second digital filters 615 and 616 may be calculated using filter functions expressed by the above equations 9 to 16.

After filter coefficients are calculated, in step S2300, the first and second digital filters 615 and 616 may be reconfigured using the calculated filter coefficients.

Coefficients of the first and second digital filters 615 and 616 may be re-calculated according to RF frequency bands of two signals, and the first and second digital filters 615 and 616 may be reconfigured using the re-calculated filter coefficients. As a result, frequency bands of signals simultaneously received by the dual band receiver of the inventive concept are not limited to a specific band, may be extended to a dual band signal at all frequency bands.

The dual band receiver according to the inventive concept may receive at least two or more signals having any frequency band and signal bandwidth using a single receiver circuit.

Further, in case of a communication manner such as a cognitive radio communication system, it is possible to provide a function of receiving any frequency band signal and at the same time scanning whether a signal exists at another frequency band.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A dual band receiver comprising:
   an analog-to-digital converter configured to convert a dual band analog signal into a digital signal; and
   a first signal extractor configured to generate a first path signal and a second path signal from the digital signal and to extract a first signal using a relative sample delay difference between the first and second path signals.

2. The dual band receiver of claim 1,
   wherein the first path signal is a signal obtained by sample delay and down sampling operation to the digital signal, and the second path signal is a signal obtained by down sampling operation to the digital signal.

3. The dual band receiver of claim 1, wherein the first path signal is a signal obtained by sample delay and decimating operation to the digital signal, and the second path signal is a signal obtained by decimating operation to the digital signal.

4. The dual band receiver of claim 2, further comprising:
   a second signal extractor configured to extract a second signal by subtracting the first signal extracted by the first signal extractor from a sample delay result of the second path signal.

5. The dual band receiver of claim 3, wherein the first signal extractor comprises:
   a first delay configured to delay the digital signal converted by the analog-to-digital converter;
   a first decimator configured to generate the first path signal by pre-filtering and down-sampling a delay result of the first delay;
   a second decimator configured to generate the second path signal by pre-filtering and down-sampling the digital signal converted by the analog-to-digital converter;
   a first digital filter configured to filter the first path signal;
   a second digital filter configured to filter the second path signal; and
   an adder configured to output the first signal by adding a filtering result of the first digital filter and a filtering result of the second digital filter.

6. The dual band receiver of claim 4, wherein the first signal extractor comprises:
   a first delay configured to delay the digital signal converted by the analog-to-digital converter;
   a first down sampler configured to generate the first path signal by down-sampling a delay result of the first delay;
   a second down sampler configured to generate the second path signal by down-sampling the digital signal converted by the analog-to-digital converter;
   a first digital filter configured to filter the first path signal;
   a second digital filter configured to filter the second path signal; and
   an adder configured to output the signal by adding a filtering result of the first digital filter and a filtering result of the second digital filter.

7. The dual band receiver of claim 6, wherein the second signal extractor comprises:
- a second delay configured to delay the second path signal; and
- a subtractor configured to extract the second signal by subtracting the first signal extracted by the first extractor from a sample delay result from the second delay.

8. The dual band receiver of claim 6, wherein a relative phase difference due to the relative sample delay difference between the first and second path signals is determined according to a sample rate of the analog-to-digital converter, a delay value of the first delay, and down sampling rates of the first and second down samplers.

9. The dual band receiver of claim 6, wherein each of digital filter coefficients of the first and second digital filters is determined by at least one of a carrier frequency of each of first and second analog signals, a frequency band location index of each of the first and second analog signals, a sampling rate of the analog-to-digital converter, a sample delay value of the first delay, a down sampling rate of each of the first and second down samplers, and a sign determined according to inversion of a spectrum of each of the first and second signals.

10. The dual band receiver of claim 6, wherein each of digital filter coefficients of the first and second digital filters is re-calculated when at least one of a carrier frequency of each of first and second analog signals, a frequency band location index of each of the first and second analog signals, a sampling rate of the analog-to-digital converter, a sample delay value of the first delay, a down sampling rate of each of the first and second down samplers, and a sign determined according to inversion of a spectrum of each of the first and second signals is changed, and the first and second digital filters are reconfigured based upon the re-calculated digital filter coefficient.

11. The dual band receiver of claim 6, wherein each of the first and second digital filters is determined to satisfy one of equations: $S(f)=S_A^\delta(f)+S_B^\delta(f)=R_{1-}(f)+R_{1+}(f)$, $S(f)=S_A^\delta(f)+S_B^\delta(f)=R_{2-}(f)+R_{2+}(f)$, $S(f)=S_A^\delta(f)-S_B^\delta(f)=R_{1-}(f)+R_{1+}(f)$, and $S(f)=S_A^\delta(f)-S_B^\delta(f)=R_{2-}(f)+R_{2+}(f)$, and
- wherein $S(f)$, $S_A^\delta(f)$, $S_B^\delta(f)$, $R_{1-}(f)$, $R_{1+}(f)$, $R_{2-}(f)$, and $R_{2+}(f)$ correspond to a spectrum of the output signal of the adder, a spectrum of the output signal of the first digital filter, a spectrum of the output signal of the second digital filter, a negative frequency spectrum of the first signal, a positive frequency spectrum of the first signal, a negative frequency spectrum of the second signal, and a positive frequency spectrum of the second signal, respectively.

12. The dual band receiver of claim 6, wherein an operating speed of each of the first and second digital filters is determined by a sampling rate of the analog-to-digital converter and a down sampling rate of each of the first and second down samplers.

13. A dual band signal receiving method of a dual band receiver comprising:
- converting a dual band analog signal into a digital signal using a single analog-to-digital converter;
- generating a first path signal and a second path signal from the digital signal;
- extracting a first signal using a relative sample delay difference between the first and second path signals;
- sample-delaying the second path signal; and
- extracting the second signal by subtracting the first signal from a sample delay result of the second path signal.

14. The dual band signal receiving method of claim 13, wherein the first path signal is a signal obtained by sample delay and down sampling operation to the digital signal, and the second path signal is a signal obtained by down sampling operation to the digital signal.

15. The dual band signal receiving method of claim 13, wherein extracting the first signal comprising:
- sample-delaying the digital signal converted by the analog-to-digital converter;
- generating the first path signal by down-sampling the sample delay result;
- generating the second path signal by down-sampling the digital signal converted by the analog-to-digital converter;
- filtering the first path signal using a first digital filter;
- filtering the second path signal using a second digital filter; and
- extracting the first signal by adding a filtering result of the first digital filter and a filtering result of the second digital filter.

16. The dual band signal receiving method of claim 15, wherein each of digital filter coefficients of the first and second digital filters is determined by at least one of a carrier frequency of each of first and second analog signals, a frequency band location index of each of the first and second analog signals, a sampling rate of the analog-to-digital converter, a sample delay value of the first delay, a down sampling rate for generating the first and second path signals, and a sign determined according to inversion of a spectrum of each of the first and second signals.

17. The dual band signal receiving method of claim 15, wherein each of digital filter coefficients of the first and second digital filters is re-calculated when at least one of a carrier frequency of each of first and second analog signals, a frequency band location index of each of the first and second analog signals, a sampling rate of the analog-to-digital converter, a sample delay value of the first delay, a down sampling rate for generating the first and second path signals, and a sign determined according to inversion of a spectrum of each of the first and second signals is changed, and the first and second digital filters are reconfigured based upon the re-calculated digital filter coefficient.

18. The dual band signal receiving method of claim 15, wherein each of the first and second digital filters is determined to satisfy one of equations: $S(f)=S_A^\delta(f)+S_B^\delta(f)=R_{1-}(f)+R_{1+}(f)$, $S(f)=S_A^\delta(f)+S_B^\delta(f)=R_{2-}(f)+R_{2+}(f)$, $S(f)=S_A^\delta(f)-S_B^\delta(f)=R_{1-}(f)+R_{1+}(f)$, and $S(f)=S_A^\delta(f)-S_B^\delta(f)=R_{2-}(f)+R_{2+}(f)$, and
- wherein $S(f)$, $S_A^\delta(f)$, $S_B^\delta(f)$, $R_{1-}(f)$, $R_{1+}(f)$, $R_{2-}(f)$, and $R_{2+}(f)$ correspond to a spectrum of the output signal of the adder, a spectrum of the output signal of the first digital filter, a spectrum of the output signal of the second digital filter, a negative frequency spectrum of the first signal, a positive frequency spectrum of the first signal, a negative frequency spectrum of the second signal, and a positive frequency spectrum of the second signal, respectively.

19. The dual band signal receiving method of claim 16, wherein an operating speed of each of the first and second digital filters is determined by a sampling rate of the analog-to-digital converter and the down sampling rate.

* * * * *